US012731936B2

(12) United States Patent
Zhang et al.

(10) Patent No.: US 12,731,936 B2
(45) Date of Patent: Sep. 8, 2026

(54) SLIDING SHUTTER FOR SOCKET CAPABLE OF PREVENTING AN ERRONEOUS INSERTION

(71) Applicant: Schneider Electric Industries SAS, Rueil Malmaison (FR)

(72) Inventors: Qianggong Zhang, Shenzhen (CN); Qilong Chen, Shenzhen (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 250 days.

(21) Appl. No.: 18/530,737

(22) Filed: Dec. 6, 2023

(65) Prior Publication Data

US 2024/0195107 A1 Jun. 13, 2024

(30) Foreign Application Priority Data

Dec. 7, 2022 (CN) ......................... 202211567734.9

(51) Int. Cl.
*H01R 13/453* (2006.01)

(52) U.S. Cl.
CPC ................................ *H01R 13/4534* (2013.01)

(58) Field of Classification Search
CPC H01R 13/4534; H01R 13/453; H01R 13/458; H01R 13/447
USPC ......................................... 439/137, 139, 140
See application file for complete search history.

(56) References Cited

U.S. PATENT DOCUMENTS 7,637,756 B1 * 12/2009 Hsu .................... H01R 13/4534 439/145
7,914,307 B1 * 3/2011 Yang .................. H01R 13/4534 439/145
8,632,347 B2 * 1/2014 Chen .................... H01R 13/453 439/145
10,096,929 B2 * 10/2018 Lee .................... H01R 13/4534
11,670,887 B2 * 6/2023 Yu ...................... H01R 13/4538 439/140
2003/0017731 A1 * 1/2003 Huang ............... H01R 13/4534 439/137
2009/0311892 A1 * 12/2009 Weeks ................ H01R 13/641 439/137
2010/0041259 A1 * 2/2010 Ni ...................... H01R 13/4534 439/137
2010/0317207 A1 * 12/2010 Huang ............... H01R 13/4534 439/137
2013/0189864 A1 * 7/2013 Chen .................... H01R 13/453 439/136

* cited by examiner

*Primary Examiner* — Hae Moon Hyeon
(74) *Attorney, Agent, or Firm* — Wolf, Greenfield & Sacks, P.C.

(57) ABSTRACT

A shutter for a socket and a socket. The shutter comprises a base comprising a first positioning member extending upwardly from a bottom surface within the base; a first slider comprising: a first slider body; a support shaft movably and rotatably coupling the first slider body to the base; a first guide surface and a second guide surface respectively provided corresponding to a live wire jack and a neutral wire jack of the socket; and a resilient member wherein the first slider body is adapted to rotate around the support shaft when only a single insert acts on one of the first guide surface and the second guide surface such that the first slider cooperates with a stopper in the socket to block the single insert from contacting a sleeve of the socket.

20 Claims, 28 Drawing Sheets

SLIDING SHUTTER FOR SOCKET CAPABLE OF PREVENTING AN ERRONEOUS INSERTION

CROSS-REFERENCE TO RELATED APPLICATIONS

This application claims priority and the benefit under 35 U.S.C. § 119 to Chinese Patent Application No. 202211567734.9, filed on Dec. 7, 2022.

FIELD

The present disclosure generally relates to the field of electrical equipment, and more specifically, to shutters for sockets and sockets.

BACKGROUND

Most sockets on the market today have shutters. A shutter is installed within a housing of a socket for automatically blocking a sleeve when a plug is removed. In addition, the shutter is capable of preventing an erroneous insertion, for example, preventing electric shock caused by a child or the like contacting a jack with a hard metal wire, and thereby protecting personal safety.

The structure of the shutter is known in various forms. At present, a common shutter is composed of many parts, which has a complex structure and occupies a large space. The interior space of the socket is typically relatively narrow and it is desirable to raise the sleeve in order to improve the reliability of insertion of pins into the sleeve. For this reason, it is desirable to simplify the structure to obtain a more compact shutter, thereby saving space within the socket.

SUMMARY

Embodiments of the present disclosure provide shutters for sockets and sockets to address at least one of the above and other potential problems of the prior art.

In a first aspect of the present disclosure, there is provided a shutter comprising a base comprising a first positioning member extending upwardly from a bottom surface within the base; a first slider comprising: a first slider body; a support shaft extending from opposite sides of the first slider body, movably and rotatably coupling the first slider body to the base; a first guide surface and a second guide surface respectively provided corresponding to a live wire jack and a neutral wire jack of the socket; and a resilient member configured to resiliently couple the first slider to the first positioning member such that the first guide surface and the second guide surface are in positions blocking the sleeve; wherein the first slider body is adapted to rotate around the support shaft when only a single insert acts on one of the first guide surface and the second guide surface such that the first slider cooperates with a stopper in the socket to block the single insert from contacting a sleeve of the socket.

In the above-mentioned embodiment, by providing the first guide surface and the second guide surface on the first slider, and by the first slider body being movably and rotatably coupled to the base, the slider rotates rather than translate when a conductive object is inserted into only one jack of the socket, thereby keeping the socket closed, and preventing the erroneous insertion, improving the safety protection level of the socket, and protecting the personal safety of the operator.

In some embodiments, the base further comprises: a first groove and a second groove respectively provided on a first side wall and a second side wall opposite to the first side wall; wherein the support shaft is coupled in the first groove and the second groove.

In the above-mentioned embodiment, the movable coupling of the base with the slider can be realized in a simple structure by providing the first groove and the second groove on the side wall of the base.

In some embodiments, the first guide surface is provided near a first end of the first slider body, and a bottom edge of the first guide surface bears against a first side of the first positioning member under the action of the resilient member, and a first side of the first positioning member is aligned with an inlet edge of a first sleeve in the corresponding sleeves.

In the above-described embodiment, the first slider is coupled to the first positioning member by the resilient member so that the first guide surface cooperates with the first positioning member to block the inlet of the socket.

In some embodiments, the shutter further comprises: a second positioning member provided on the bottom surface at a predetermined distance from the first positioning member, wherein a second guide surface is provided opposite to the first guide surface at the second end of the first slider body, a bottom edge of the second guide surface bears against a first side of the second positioning member under the action of the resilient member, and the first side of the second positioning member is aligned with an inlet edge of a second one of the corresponding sleeves.

In the above-described embodiment, the first slider is coupled to the second positioning member by the resilient member, and the second guide surface cooperates with the second positioning member, thereby blocking the inlet of the other socket.

In some embodiments, the support shaft and the resilient member are configured such that the first slider body maintains a predetermined gap with the bottom surface when neither the first guide surface nor the second guide surface is separately pressed.

In the embodiments described above, the first slider body is suspended above the base by the support shaft and the resilient member, and the first slider is able to translate when the two pins of the socket are simultaneously inserted into the jacks, thereby exposing the inlet of the socket and allowing the pins to contact or be inserted into the socket.

In some embodiments, the stopper comprises: a first stopper configured to: when the first slider body rotates in a first rotational direction due to a single insert acting on the first guide surface, bear against a lower portion of a first end of the first slider body to prevent the first slider from moving in a first direction; and a second stopper configured to: when the first slider body rotates in a second direction of rotation opposite to the first direction of rotation due to a single insert acting on the second guide surface, bear against an upper portion of a first end of the first slider body to prevent the first slider from moving in the first direction In the above-mentioned embodiment, by the first stopper and the second stopper cooperating with the first slider body, the sleeve protected by the shutter cannot be accessed either the live wire jack or the neutral wire insertion jack is inserted separately.

In some embodiments, the first stopper is provided on a bottom surface within the base; a second stopper is provided within the housing of the receptacle.

In the above embodiment, by providing the first stopper on the bottom surface within the base, it is possible to block the translation of the first slider when the end of the first slider rotates toward the bottom surface; by arranging the first stopper in the housing of the socket, e.g., on the side of the top surface opposite the bottom surface, it is possible to block the translation of the first slider when the end of the first slider rotates away from the bottom surface, whereby preventing monopolar insertion.

In some embodiments, a first protruding structure is provided at a first end of the first slider body, wherein the first protruding structure is adapted to bear against the stopper.

In the above-described embodiment, by providing the first protruding structure at the first end of the first slider body, it is possible to facilitate engagement of the first slider with the first stopper and the second stopper, respectively, to achieve prevention of translation of the first slider.

In some embodiments, the first guide surface and the second guide surface are inclined surfaces and inclined in the same direction.

In the above-described embodiment, by providing the first guide surface and the second guide surface as surfaces inclined toward the same direction, it is possible to allow the two pins of the first slider plug to be translated toward the same direction upon insertion so as to allow the pins to contact or be inserted into the sleeve. The number of sliders can be reduced compared to known solutions in which two sliders relative to each other move in opposite directions.

In some embodiments, the first slider body has a hollow structure, and is provided in the base around the first positioning member, and the first guide surface and the second guide surface are oppositely provided at both sides of the first positioning member.

In the above-described embodiment, by providing the first slider body to have the hollow structure, the first positioning member can be provided in the hollow structure, so that the first slider can be positioned with only one resilient member, and the number of resilient members can be reduced compared to known solutions using at least two resilient members.

In some embodiments, a first protrusion is provided on one side of the first positioning member; a second protrusion is provided on an inner wall of the first slider body close to the second guide surface; one end of the resilient member is fixedly coupled to the first protrusion, and the other end of the resilient member is fixedly coupled to the second protrusion.

In the above-described embodiment, the resilient member can be coupled to the first positioning member in a simple and reliable manner by providing a protrusion on one side of the first positioning member and the inner wall near the second guide surface.

In some embodiments, the shutter further comprises: a second slider movably coupled to the first slider and adapted to move along a second direction perpendicular to the first direction, the second slider comprising: a second slider body; a third guide face, located at one end of the second slider body, adjacent to the second guide face, corresponding to a jack perpendicular to a jack corresponding to the second guide face, and adapted to block the single insert from contacting the corresponding sleeve; and wherein when only the third guide surface is acted upon by an insert, the second slider drives the first slider body to rotate about the support shaft in a second rotation direction such that a first end of the first slider body bears the second stopper, and the second slider body cooperates with a stopping portion in the socket to prevent the single insert from contacting the socket.

In the above embodiment, the jack perpendicular to the jack corresponding to the second guide surface is blocked by providing the second slider. This solution is particularly applicable to the socket with T-shaped jacks, such as the American standard socket of 20 A, which prevents a single insert from contacting either sleeve of the two mutually perpendicular jacks in the T-shaped jacks.

In some embodiments, the second slider further comprises: a second protruding structure provided on a side of the second slider body facing a bottom surface of the base; wherein, the stopping portion is provided on a bottom surface within the base, and the stopping portion is configured to: cooperate with the second protruding structure to prevent the first slider from moving in the second direction when the second slider rotates in the second rotational direction.

In the embodiment described above, the second slider is prevented from translating during the insertion of the monopolar insertion by the cooperation of the second projecting structure with the stopping portion within the base, so as to block the corresponding jack.

In some embodiments, the first slider includes a rail extending from a first end of the first slider body in the second direction; the second slider includes a clamping structure extending from the second slider body to clamp the rail and adapted to slide along the rail, and adapted to rotate with the first slider body about the support shaft.

In the above-described embodiments, by providing the rail at the first end of the first slider body, in cooperation with the clamping structure of the second slider, it is possible to achieve that when a single insert is inserted into the jack, the first slider body rotates together with the second slider without translating, thereby achieving that the single insert is prevented from contacting the sleeve.

In some embodiments, one end of the rail is provided with a first inclined surface; one end of the second slider body is provided with a second inclined surface, and the second inclined surface is adapted to cooperate with the first inclined surface so as to drive the second slider to reset when the first slider resets under the action of the resilient member.

In the above-mentioned embodiment, by providing the first inclined surface on the rail; one end of the second slider body provided with the second inclined surface, and the second inclined surface adapted to cooperate with the first inclined surface, the second slider is driven to reset when the first slider resets under the action of the resilient member.

In some embodiments, the clamping structure comprises: a first extension portion; a second extension portion provided opposite to the first extension portion and adapted to be clamped on both sides of the rail; and a connecting portion connecting the first extending portion and the second extending portion, one side of the connecting portion having a curved surface structure that bears against an inner wall of the base to adapt to the rotation of the clamping structure; the first extension portion, the second extension portion and the connecting portion constituting a U-shaped structure.

In the embodiments described above, the clamping structure can be moved relative to the rail by clamping the first extension portion and second extension portion of the clamping structure on both sides of the rail. In addition, the first extension portion and second extension portion can rotate together along with each other, so as to cooperate with a stopping structure provided in the base or in the housing to prevent the translation of the first slider and the second slider, thereby achieving the function of preventing erroneous insertion.

According to another aspect of an embodiment of the present disclosure, there is provided a socket including a housing; the shutter according to the first aspect, provided within the housing; a body portion coupled to the shutter, wherein the sleeve is provided in the body portion.

In the above-described embodiment, by providing the shutter, when the conductive object is inserted into one of the jacks in the socket, the slider rotates rather translate, thereby keeping the socket closed, thereby preventing erroneous insertion, improving the safety protection level of the socket, and protecting the personal safety of the operator.

As will be understood from the following description, by means of the technical solutions of the embodiments of the present disclosure, it is possible to achieve a reliable anti-erroneous insertion function in a simple structure, with a small number of shutter parts, a compact structure, and reduced manufacturing and installation costs.

This Summary is provided to introduce a selection of concepts in a simplified form that are further described below in the Detailed Description. The summary is not intended to identify key features or essential features of the disclosure, nor is it intended to limit the scope of the disclosure.

BRIEF DESCRIPTION OF THE DRAWINGS

In the various figures, the same or corresponding reference numerals indicate the same or corresponding parts.

DETAILED DESCRIPTION OF EMBODIMENTS

Figure 1:
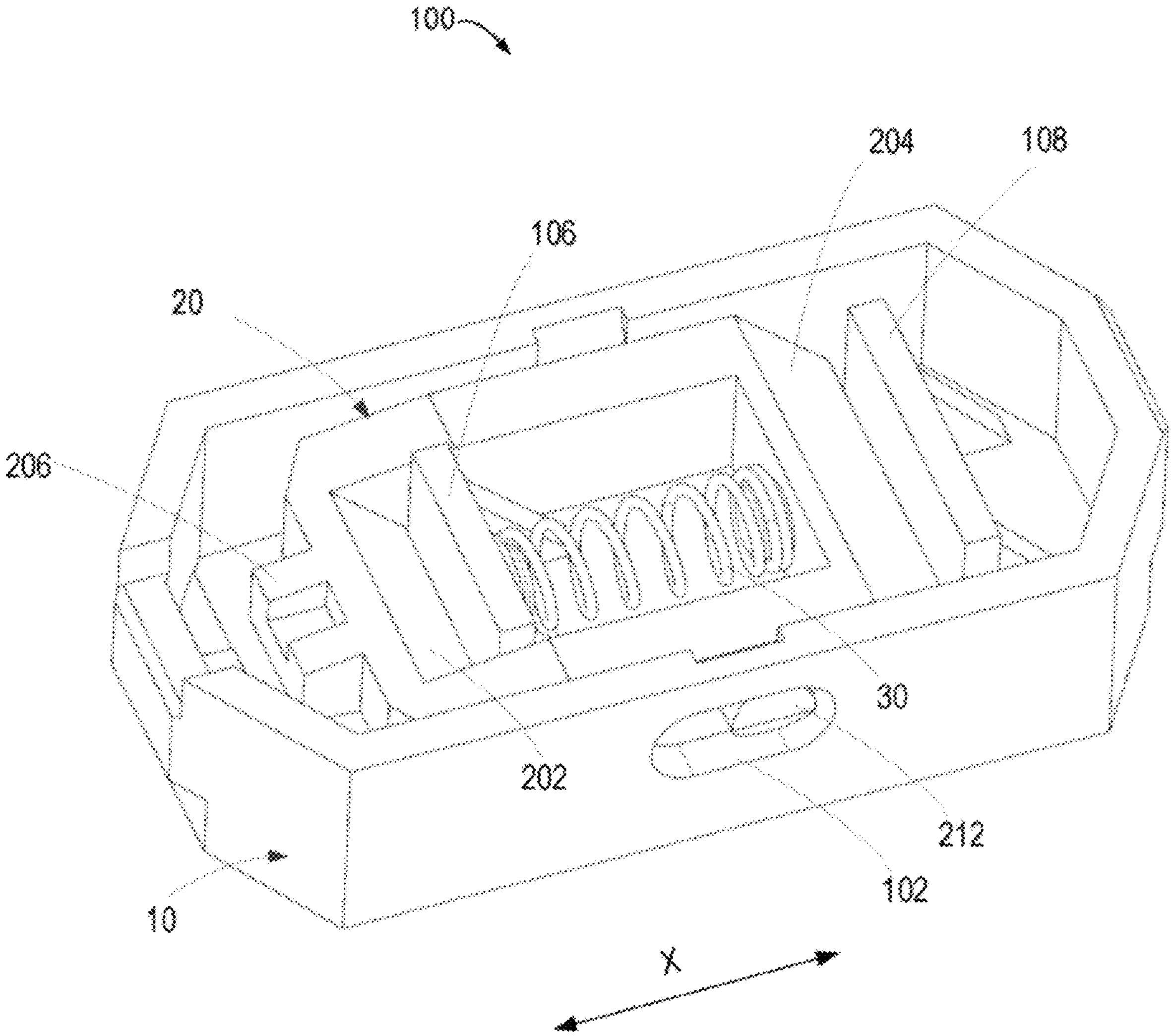
FIG. 1 illustrates a perspective schematic view of a shutter for a socket according to some exemplary embodiments of the present disclosure.

The principles of the present disclosure will now be described with reference to various exemplary embodiments illustrated in the accompanying drawings. It should be understood that the description of these embodiments is merely intended to enable those skilled in the art to better understand and to further practice the present disclosure, and is not intended to limit the scope of the present disclosure in any way. It should be noted that where possible, similar or identical reference numbers may be used throughout the drawings and may indicate similar or identical functionality. Those skilled in the art will readily recognize from the following description that alternative embodiments of the structures and methods illustrated herein may be employed without departing from the principles of the invention described herein.

As used herein, the term “includes” and its variants are to be read as open-ended terms that mean “includes, but is not limited to.” The term “or” is to be read as “and/or” unless the context clearly indicates otherwise. The term “based on” is to be read as “based at least in part on.” The terms “one example embodiment” and “one embodiment” are to be read as “at least one example embodiment.” The term “a further embodiment” is to be read as “at least a further embodiment.” The terms “first”, “second” and so on can refer to same or different objects.

As previously mentioned, the more common shutters today consist of multiple components, are complex in construction and take up more space. It would be desirable to simplify the structure of the shutter to obtain a more compact shutter, thereby saving space within the socket.

Accordingly, there is a need for an improved solution to reduce the number of components and to achieve shutter with a compact structure and a reliable performance.

Embodiments of the present disclosure provide an improved shutter for a socket. The shutter of the embodiment of the present disclosure includes the base, the first slider, and the resilient member. The base includes a first positioning member extending upwardly from the bottom surface within the base. The first slider may include a first slider body and a support shaft. The support shaft extends from opposite sides of the first slider body, movably and rotatably coupling the first slider body to the base. The first slider further comprises the first guide surface and the second guide surface respectively provided corresponding to a live wire jack and a neutral wire jack of the socket. In other words, the first guide surface and the second guide surface block the live wire and the neutral wire jacks of the socket, respectively. The resilient member may be configured to resiliently couple the first slider to the first positioning member such that the first guide surface and the second guide surface are in a position blocking the sleeve, and wherein the first slider body is adapted to rotate around the support shaft when only a single insert acts on one of the first guide surface and the second guide surface such that the first slider cooperates with the stopper in the socket to block the single insert from contacting the sleeve of the socket. In the above-described embodiment, when a conductive object is inserted into one of the jacks in the socket, the slider rotates rather than translate, keeping sleeve closed and thereby preventing the erroneous insertion. In this way, the level of safety protection of the socket can be improved to further protect personal safety of the operator.

Hereinafter, embodiments of the present disclosure will be described in detail with reference to the accompanying drawings.

Figure 2:
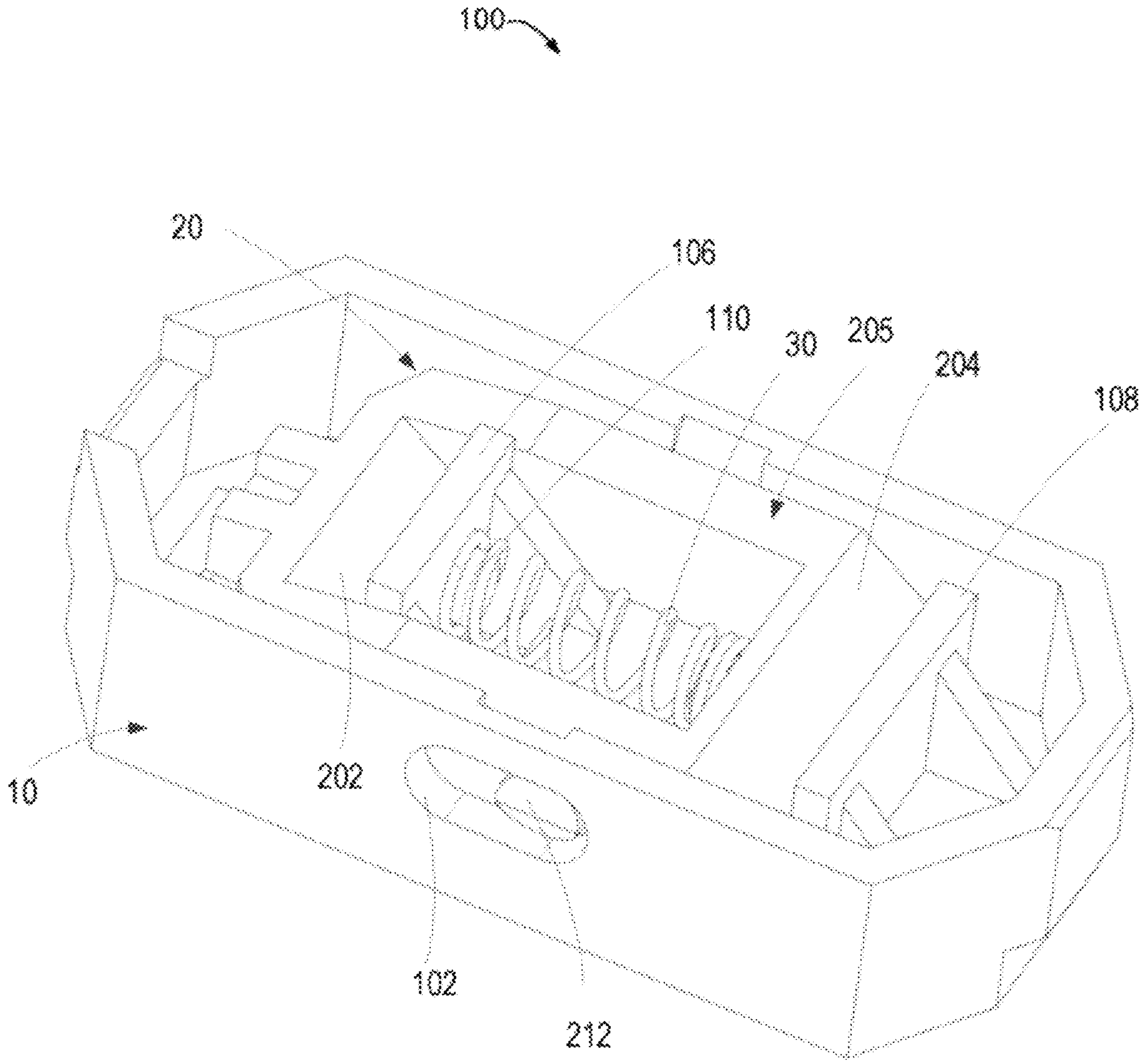
FIG. 2 illustrates a perspective schematic view at another angle according to some exemplary embodiments of the present disclosure.

A shutter 100 according to some embodiments of the present disclosure is first described with reference to FIGS. 1-4. FIG. 1 illustrates a perspective schematic view of a shutter 100 for a socket 200 according to some exemplary embodiments of the present disclosure. FIG. 2 illustrates a perspective schematic view at another angle according to some exemplary embodiments of the present disclosure.

Figure 3:
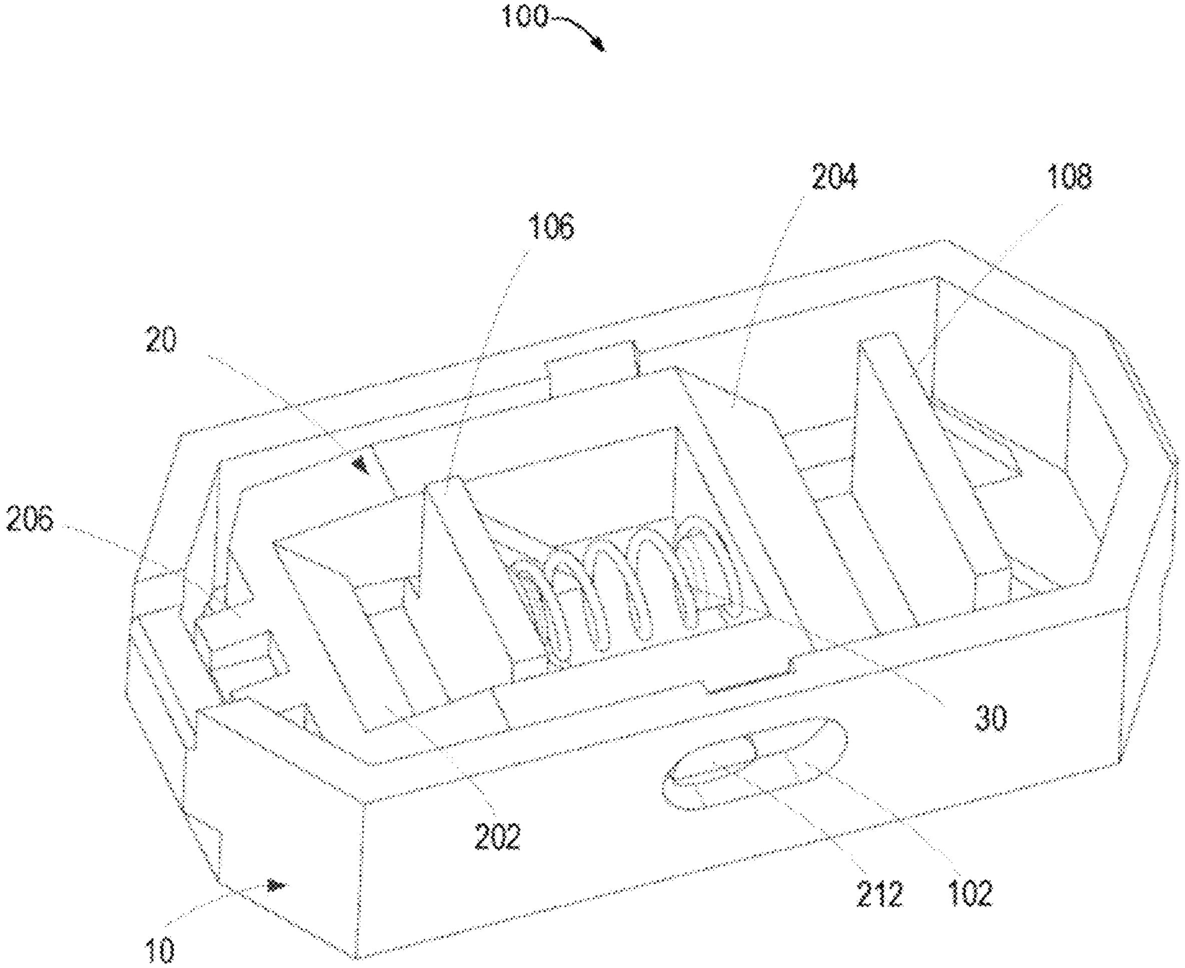
FIG. 3 illustrates a perspective schematic view of the shutter in an open state according to FIGS. 1 and 2.
Figure 4:
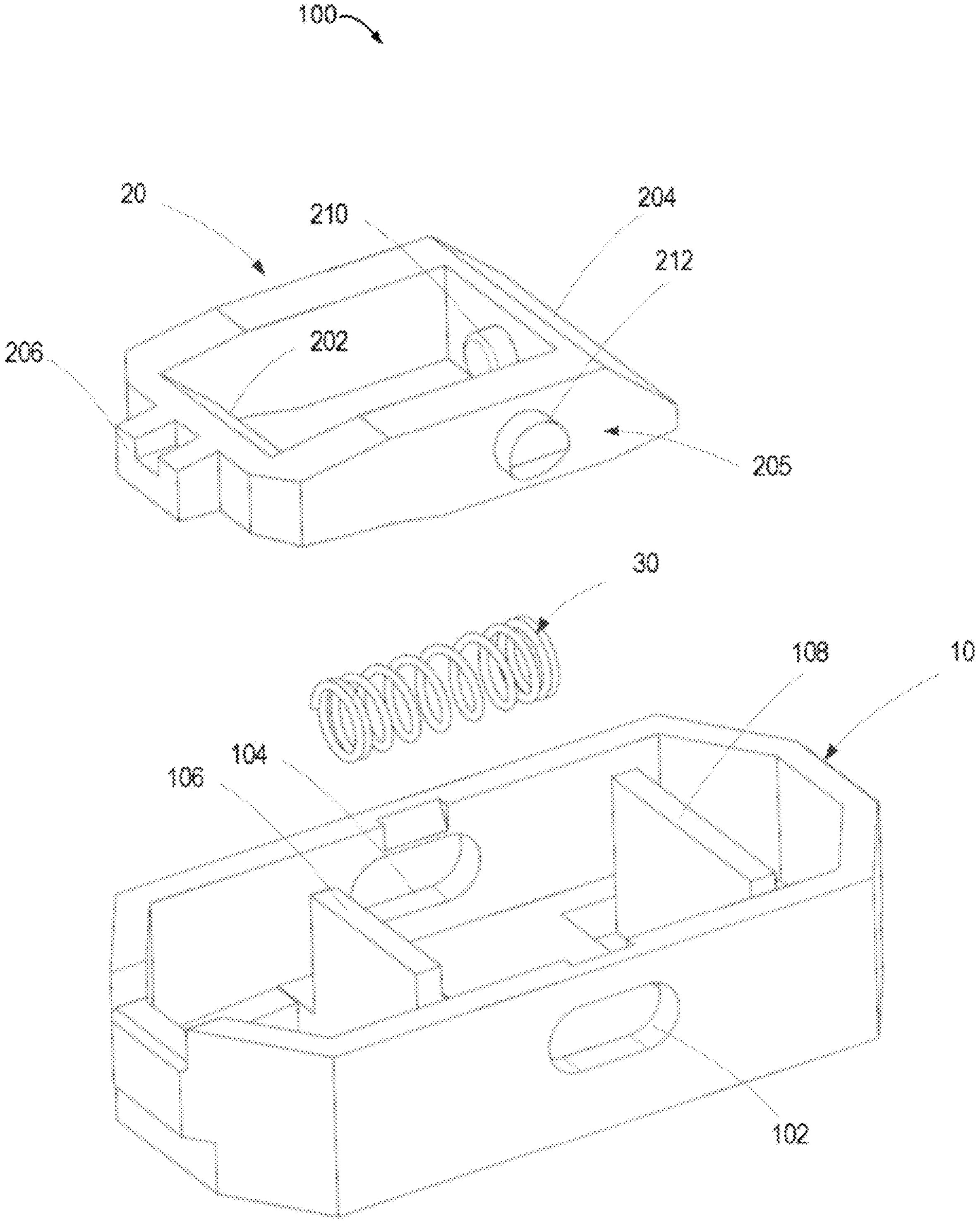
FIG. 4 illustrates an explosion diagram of a shutter according to some exemplary embodiments of the present disclosure.

FIG. 3 illustrates a perspective view of the shutter 100 illustrates according to FIGS. 1 and 2. FIG. 4 illustrates an explosion diagram of the shutter 100 according to some exemplary embodiments of the present disclosure.

As shown in FIGS. 1 to 4, the shutter 100 may include a base 10, a first slider 20, and a resilient member 30. The base 10 may include a first positioning member 106 extending upwardly from the bottom surface within the base 10. As shown in FIG. 1, the first positioning member 106 has a plate-like structure, and is provided at a position near a left side on the bottom surface within the base 10, and extends upward from the bottom surface. The embodiments of the present disclosure are not so limited, and the first positioning member 106 may be other shapes and may be provided at other positions within the base 10.

The first slider 20 may include a first slider body 205, a support shaft 212, and a first guide surface 202 and a second guide surface 204. The first slider body 205 may have a hollow structure provided within the base 10 around the first positioning member 106. The first guide surface 202 and the second guide surface 204 may be oppositely provided on both sides of the first positioning member 106. A first end of the first slider body 205 is provided with a first protruding structure 206 adapted to bear against the stopper. In other words, the first slider 20 can be prevented from moving in a first direction X by the first protruding structure 206 bearing against the stopper.

In some embodiments, the support shaft 212 may extend from opposite sides of the first slider body 205 to movably and rotatably couple the first slider body 205 to the base 10. The support shaft 212 may be integrally formed with the first slider body 205 or may be a separate component, rotatably or fixedly coupled to the first slider body 205.

In some embodiments, the base 10 may include a first groove 102 and a second groove 104 respectively provided on a first sidewall and a second sidewall opposite to the first sidewall of the base 10, and extending in the first direction X. The support shaft 212 may be coupled to and slidable or rotatable within the first and second grooves 102, 104. In other words, the support shaft 212 is possible to move along the extending direction of the first groove 102 and the second groove 104 (i.e., the first direction X) in the base 10 together with the first slider body 205 and to rotate together with the first slider body 205.

The first guide surface 202 and the second guide surface 204 may be respectively provided corresponding to the live wire jack and the neutral wire jack of the socket 200. In other words, the first guide surface 202 and the second guide surface 204 block the live wire jack and the neutral wire jack of the socket 200, respectively. In some embodiments, as shown in FIGS. 1-4, the first guide surface 202 and the second guide surface 204 are inclined surfaces and are inclined in the same direction. In this manner, when the two pins 502 of the plug of the first slider 20 are inserted into the first guide surface 202 and the second guide surface 204, the first slider 20 is subjected to a force applied in the same direction so as to translate to allow the pins 502 to contact or be inserted into the sleeve. The embodiment of the present disclosure is not limited to this, and the first guide surface 202 and the second guide surface 204 may be curved surfaces as long as a lateral urging force is generated by an insert object inserted into the jacks.

In some embodiments, the resilient member 30 may be configured to resilientally couple the first slider 20 to the first positioning member 106, and the resilient force of the resilient member 30 causes the first guide surface 202 and the second guide surface 204 to be in a position blocking the sleeve. A first protrusion 110 may be provided on one side of the first positioning member 106; a second protrusion 210 may be provided on an inner wall of the first slider body 205 close to the second guide surface 204; one end of the resilient member 30 is fixedly coupled to the first protrusion 110, and the other end of the resilient member 30 is fixedly coupled to the second protrusion 210. The embodiment of the present disclosure is not limited thereto, and the resilient member 30 may couple the first slider 20 and the first positioning member 106 in other manners.

The first guide surface 202 may be provided near a first end of the first slider body 205, and a bottom edge of the first guide surface 202 bears against a first side of the first positioning member 106 under the action of the resilient member 30, and a first side of the first positioning member 106 may be aligned with an inlet edge of a first sleeve in the corresponding sleeve 504. In this way, the first guide surface 202 can achieve a blockage in an entrance to a socket.

In some embodiments, the support shaft 212 and the resilient member 30 may be configured such that the first slider body 205 maintains a predetermined gap with the bottom surface when neither the first guide surface 202 nor the second guide surface 204 is separately pressed. In other words, the first slider body 205 is suspended above the base 10 by the support shaft 212 and the resilient member 30, whereby the first slider 20 can be translated when the two pins 502 of the socket 200 are simultaneously inserted into the jack, thereby exposing the entrance of the sleeve and allowing the pins 502 to contact or be inserted into the sleeve.

In some embodiments, the shutter 100 may also include a second positioning member 108. The second positioning member 108 may be provided on the bottom surface at a predetermined distance from the first positioning member 106. As shown in FIG. 1, the second positioning member 108 may have a plate-like structure provided at a right side of the bottom surface in the base 10 and extend upward from the bottom surface. The second guide surface 204 may be provided opposite to the first guide surface 202 at a second end of the first slider body 205, and a bottom edge of the second guide surface 204 may bear against a first side of the second positioning member 108 under the action of the resilient member 30, and a first side of the second positioning member 108 may align with an inlet edge of a second one of the corresponding sleeves. The structure of the second positioning member 108 described above is merely exemplary, and the present disclosure is not limited thereto, but may be variously modified, for example, the second positioning member 108 may be formed as a part of the inner wall of the base 10.

In some embodiments, the first slider body 205 is configured to rotate around the support shaft 212 when only a single insert acts on one of the first guide surface 202 and the second guide surface 204 such that the first slider 20 cooperates with a stopper in the socket 200 to block the single insert from contacting the sleeve of the socket 200.

In some embodiments, the stopper includes a first stopper 114 and a second stopper 116. The first stopper 114 may be provided on a bottom surface within the base 10 and the second stopper 116 may be provided within the housing 70 of the socket 200.

In some embodiments, the first stopper 114 may be configured to: when the first slider body 205 rotates in the first rotation direction R1 due to the single insert acting on the first guide surface 202, bear against the lower portion of the first end of the first slider body 205 to prevent the first slider 20 from moving in the first direction X. The second stopper 116 may be configured to: when the first slider body 205 rotates in the second rotation direction R2 opposite to the first rotation direction R1 due to the single insert acting on the second guide surface 204, bear against an upper portion of the first end of the first slider body 205 to prevent the first slider 20 from moving in the first direction X.

The above-described embodiments are illustrative embodiments of the present disclosure, and the embodiments of the present disclosure are not limited thereto. For example, the first stopper 114 and the second stopper 116 may both be provided on the base 10 or may both be provided on the housing 70. As long as the stopper can cooperate with the second slider, block the translation of the first slider 20.

Figure 5:
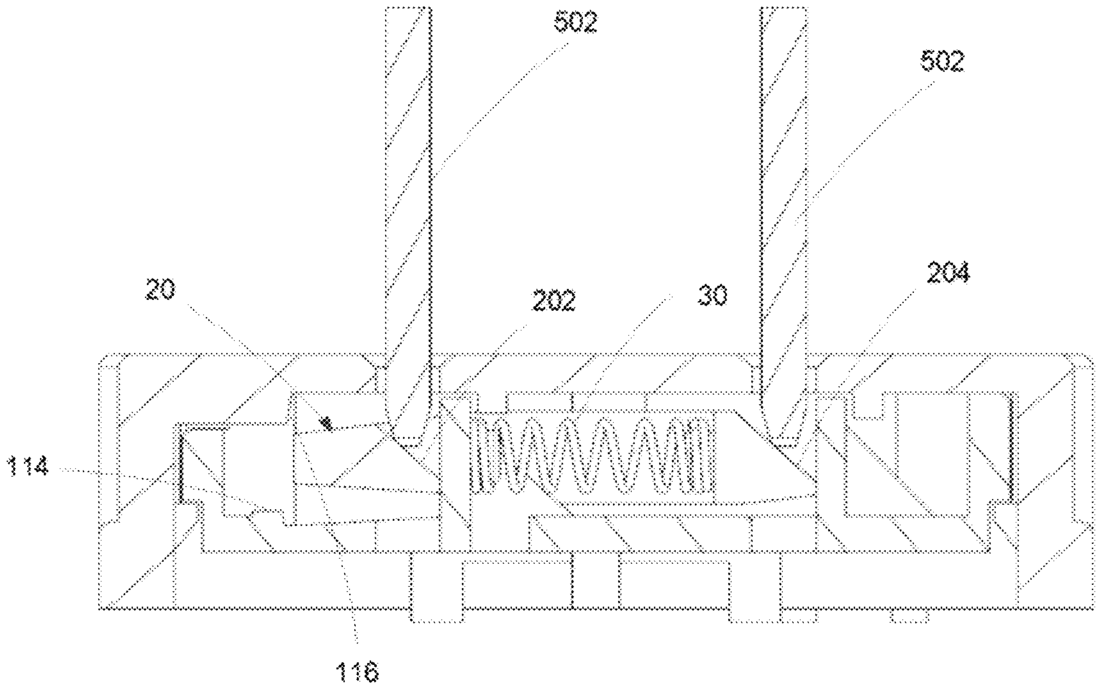
FIG. 5 illustrates a schematic cross-sectional view of a shutter with pins partially inserted according to some exemplary embodiments of the present disclosure.
Figure 6:
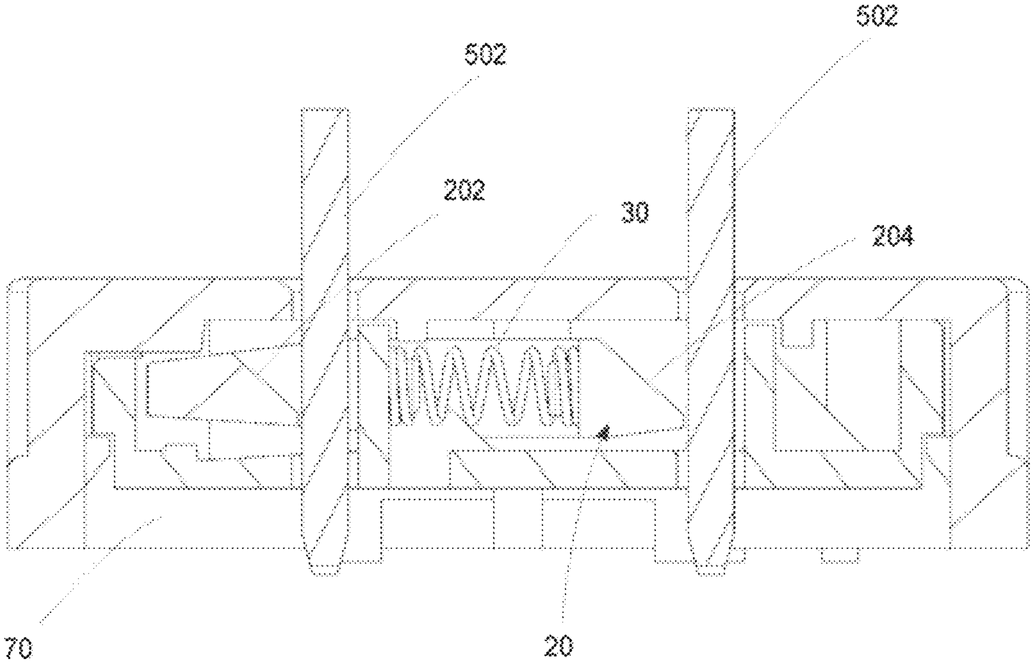
FIG. 6 illustrates a schematic cross-sectional view of a shutter with pins penetrated according to some exemplary embodiments of the present disclosure.

The operating state of the shutter 100 according to some embodiments of the present disclosure will now be described with reference to FIGS. 5 and 6. FIG. 5 illustrates a schematic cross-sectional view of a shutter 100 with pins 502 partially inserted according to some exemplary embodiments of the present disclosure; FIG. 6 illustrates a schematic cross-sectional view of a shutter 100 with pins 502 penetrated according to some exemplary embodiments of the present disclosure.

As shown in FIGS. 5 and 6, the shutter 100 is provided in the housing 70. As shown in FIG. 5, two pins 502 are inserted into the housing 70 and act on the first guide surface 202 and the second guide surface 204. The two pins 502 may be the live wire pins and neutral wire pins of the plug. As shown in FIG. 6, two pins 502 push the first slider 20 to the left and through the shutter 100 and then insert into the sleeve under the shutter 100.

Figure 7:
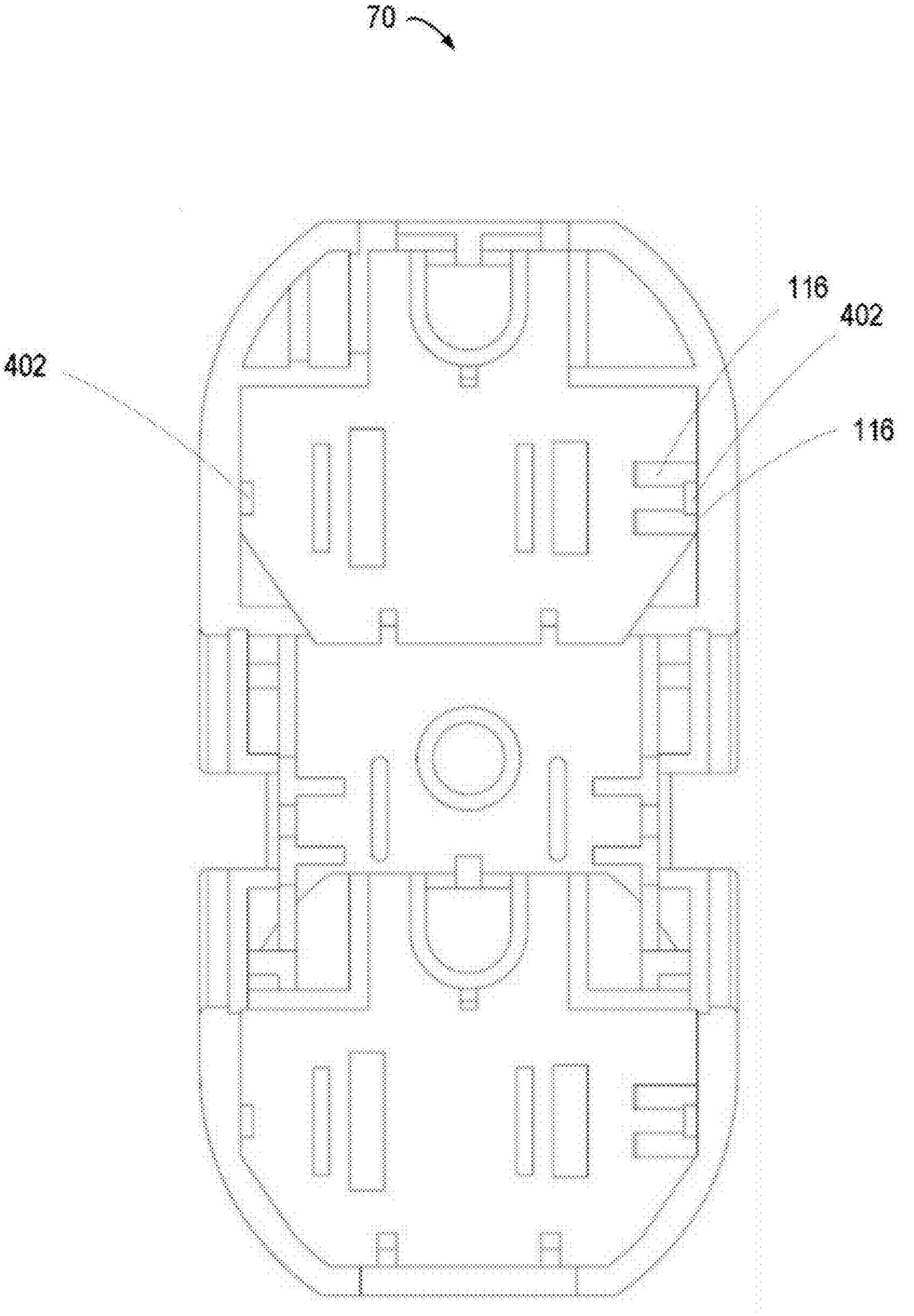
FIG. 7 illustrates a bottom view of a housing of a socket according to some exemplary embodiments of the present disclosure.
Figure 8:
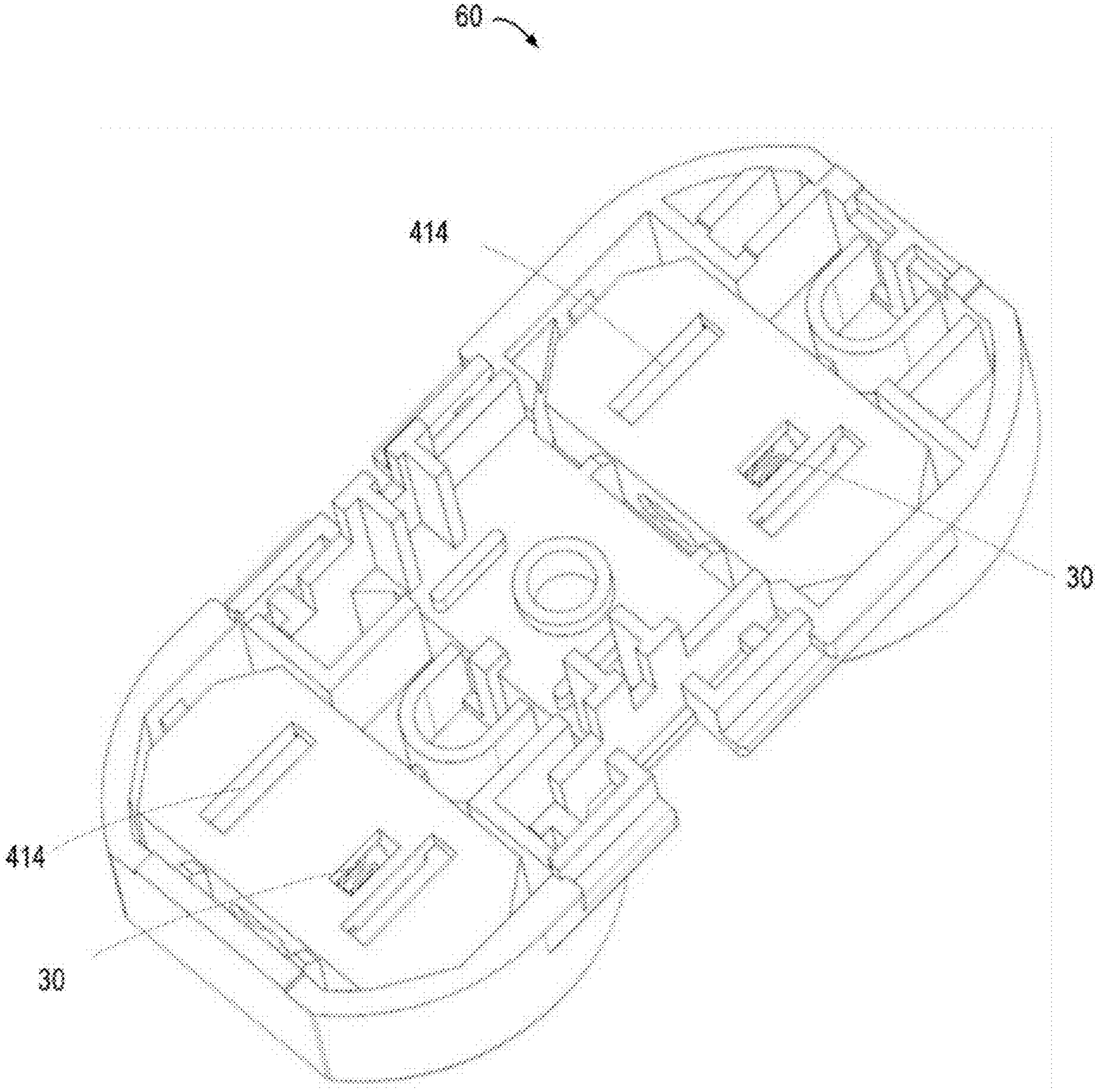
FIG. 8 illustrates a bottom perspective view of a housing with a shutter installed according to some exemplary embodiments of the present disclosure.

The housing 70 of the socket 200 mounted with a shutter 100 according to some embodiments of the present disclosure is described below in conjunction with FIGS. 7 and 8. FIG. 7 illustrates a bottom view of the housing 70 of the socket 200 according to some exemplary embodiments of the present disclosure FIG. 8 illustrates a bottom perspective view of the housing 70 with a shutter 100 installed according to some exemplary embodiments of the present disclosure.

A snap 402 and the second stopper 116 are provided on the housing 70 as shown in FIG. 7. The snap 402 can fix the base 10 of the shutter 100 in the housing 70, and the base 10 of the shutter 100 can be provided with a clamping groove corresponding thereto. In FIG. 8, the shutter 100 is covered by the housing 70, which is substantially invisible in this figure, except for the resilient member 30. In addition, as shown in FIGS. 7 and 8, the bottom surface of the housing 70 is provided with a jack 414 into which the pins 502 are inserted.

The operation principle of the shutter 100 of the embodiment of the present disclosure will be described below with reference to FIGS. 9 to 12.

Figure 9:
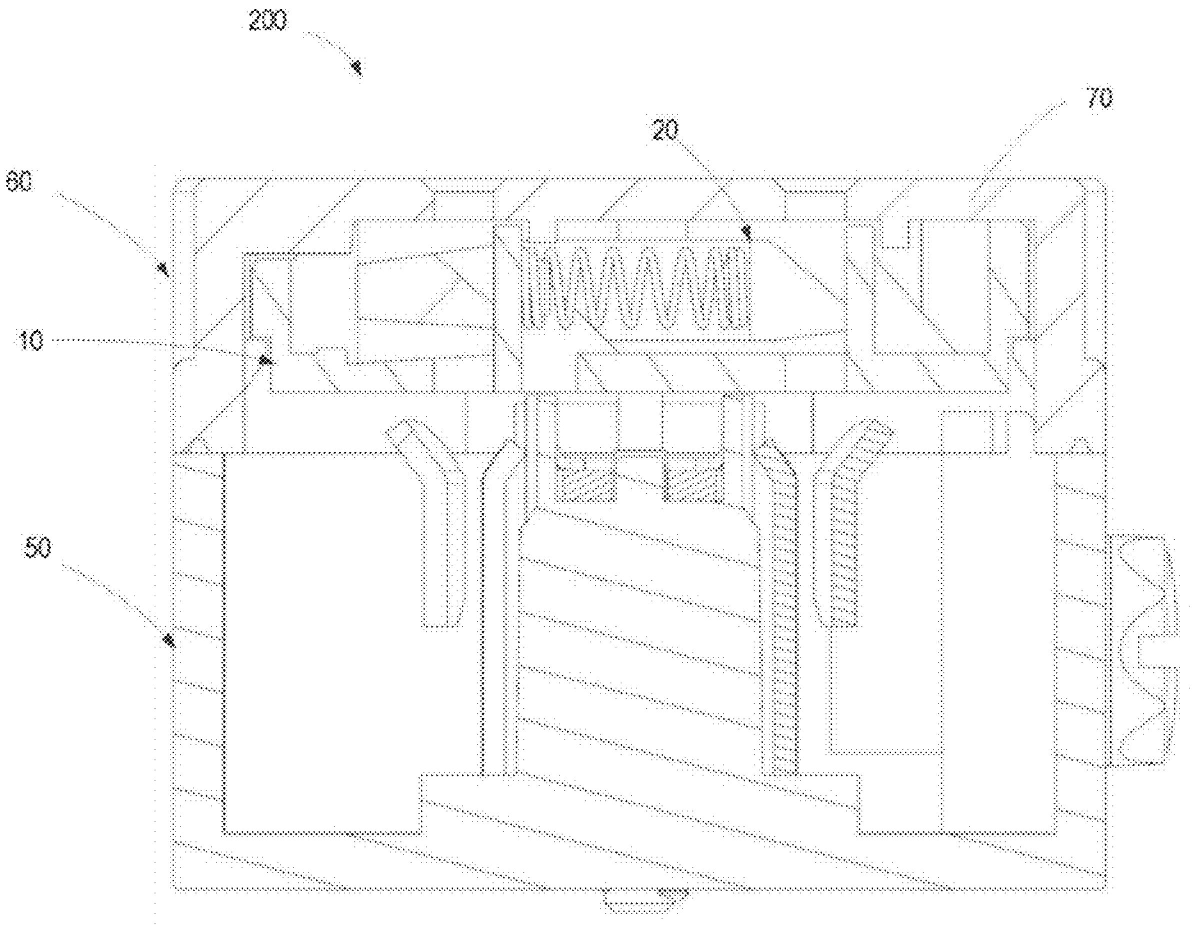
FIG. 9 illustrates a cross-sectional view of a socket with a shutter installed according to some exemplary embodiments of the present disclosure.
Figure 10:
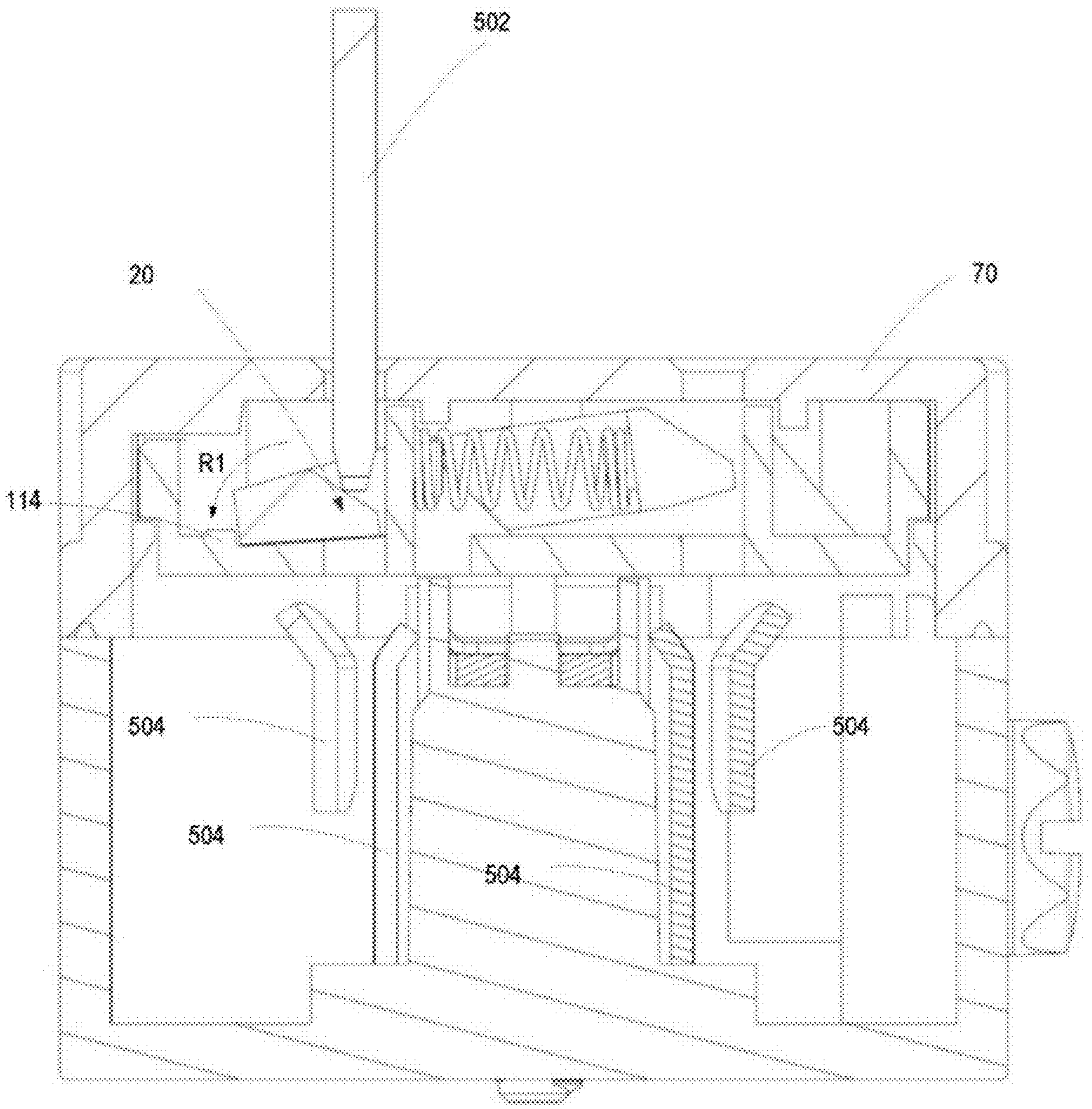
FIG. 10 illustrates a cross-sectional view of socket with a shutter installed when a single pin acts on either a live wire jack or a neutral wire jack according to some exemplary embodiments of the present disclosure.
Figure 11:
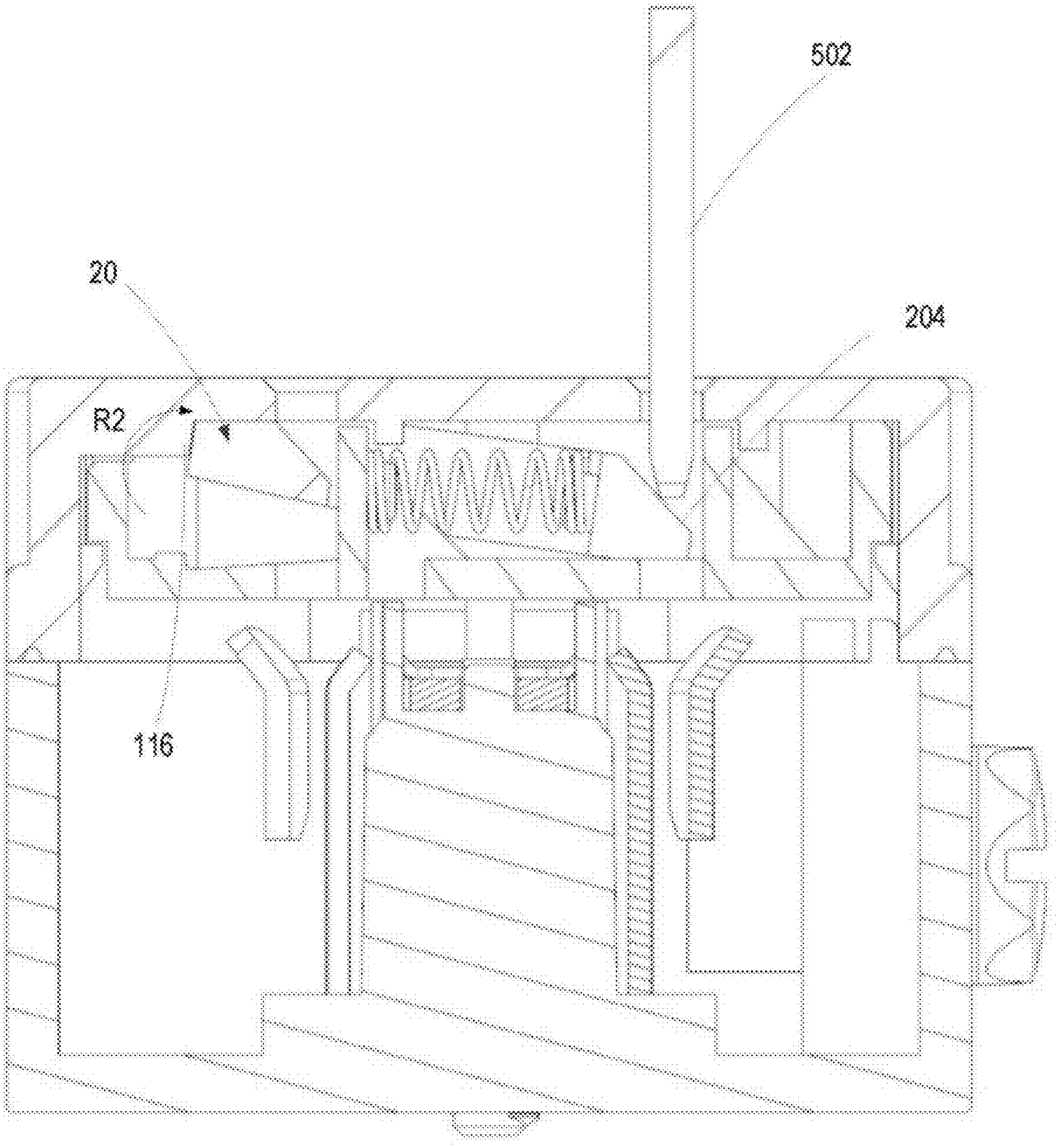
FIG. 11 illustrates a cross-sectional view of socket with a shutter installed when a single pin acts on either a live wire jack or a neutral wire jack according to some exemplary embodiments of the present disclosure.
Figure 12:
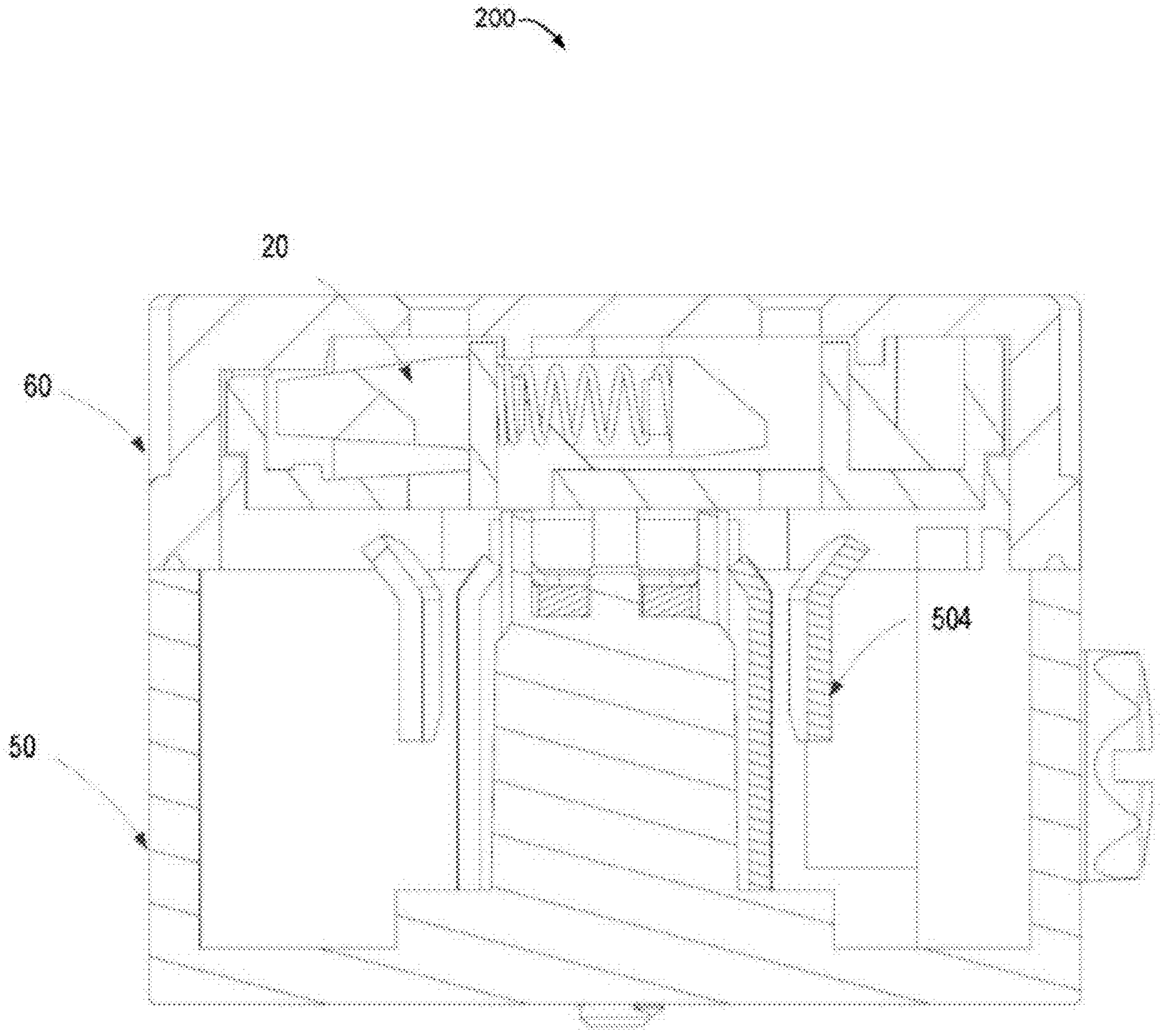
FIG. 12 illustrates a schematic cross-sectional view of a socket with a shutter installed in an open state of the shutter according to some exemplary embodiments of the present disclosure.

FIG. 9 illustrates a cross-sectional view of a socket 200 with a shutter installed according to some exemplary embodiments of the present disclosure. FIG. 10 illustrates a cross-sectional view of socket 200 with a shutter 100 installed when a single pin 502 acts on either a live wire jack or a neutral wire jack according to some exemplary embodiments of the present disclosure. FIG. 11 illustrates a cross-sectional view of socket 200 with a shutter 100 installed when a single pin 502 acts on either a live wire jack or a neutral wire jack according to some exemplary embodiments of the present disclosure. FIG. 12 illustrates a schematic cross-sectional view of a socket 200 with a shutter 100 installed in an open state of the shutter 100 according to some exemplary embodiments of the present disclosure.

As shown in FIGS. 9 to 10, the shutter 100 is provided in the housing 70. A shutter assembly 60 composed of the housing 70 together with the internal shutter 100 is provided on the body portion 50 of the lower socket 200. The body portion 50 is provided with the sleeve. FIG. 9 shows a state in which no pins 502 are inserted into the housing 70. In this state, the shutter 100 is in a closed state, i.e., the first guide surface 202 and the second guide surface 204 close the entrance of the corresponding sleeve 504, preventing the single insert, such as the single pin 502, from contacting the sleeve 504.

As shown in FIG. 10, the single pin 502 is inserted into the housing 70 and acts on the first guide surface 202. The first slider 20 is forced to rotate in the first rotation direction R1. The first end of the first slider 20 bears against the first stopper 114 provided on the base 10 and cannot continue to rotate nor move in the first direction X. Thus, the bottom edge of the first guide surface 202 remains substantially against the left side of the first positioning member 106 as it would be in the absence of an external force. Thus, the single pin 502 inserted into a left-side socket cannot cause the first slider 20 to move to the left to expose the blocked entrance of the sleeve 504.

As shown in FIG. 11, the single pin 502 is inserted into the housing 70 and acts on the second guide surface 204. The first slider 20 is forced to rotate in the second rotation direction R2. The first end of the first slider 20 bears against the second stopper 116 provided on the housing 70. No further rotation or movement in the first direction X is possible. Thus, the bottom edge of the second guide surface 204 remains substantially against the left side of the first positioning member 106. Thus, the single pin 502 inserted into a right-side socket cannot cause the first slider 20 to move to the left to expose the blocked entrance of the sleeve 504.

As can be seen, in the embodiment described above, the first slider body 205 rotates about the support shaft 212 when only the single insert (e.g., the pin 502) acts on one of the first guide surface 202 and the second guide surface 204, such that the first slider 20 cooperates with the stopper in the socket 200 to prevent the first slider 20 from translating, thereby keeping the sleeve 504 closed to block the single insert from contacting the sleeve 504 of the socket 200. Thus, erroneous insertion can be prevented. In this way, the level of safety protection of the socket can be improved to further protect personal safety of the operator.

As shown in FIG. 12, the socket 200 with the shutter 100 installed is in an opened state of the shutter 100, thereby allowing the pins 502 to contact or insert into the sleeve 504.

Figure 13:
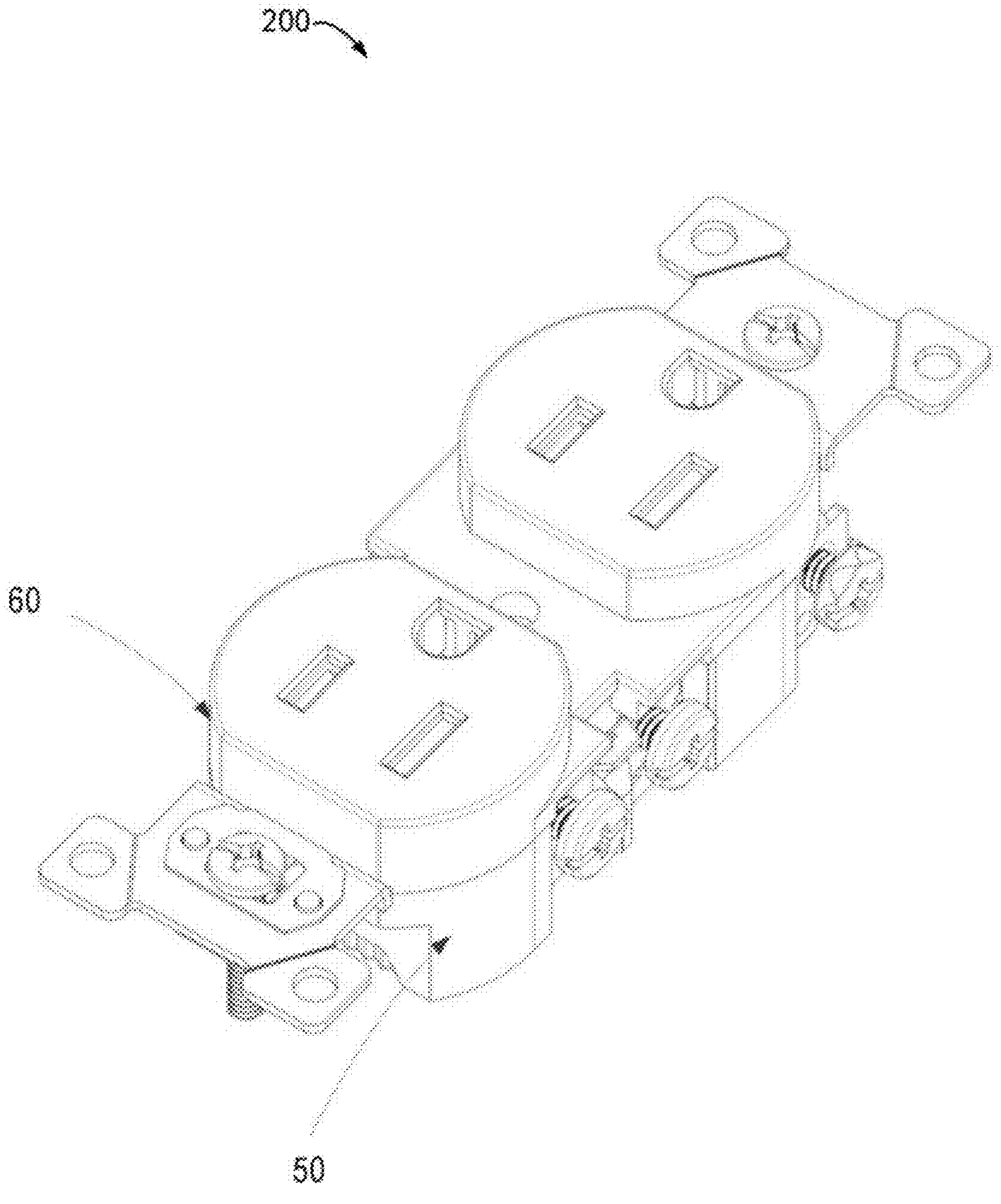
FIG. 13 illustrates a perspective schematic view of an outline of a socket with a shutter installed according to some exemplary embodiments of the present disclosure.

FIG. 13 illustrates a perspective schematic view perspective schematic view of the socket 200 with the shutter 100 installed according to some exemplary embodiments of the present disclosure. As shown in FIG. 13, two sets of sockets 200 are shown for insertion of two plugs.

Further embodiments of shutters 100 of the present disclosure are described below in conjunction with FIGS. 14 through 18.

Figure 14:
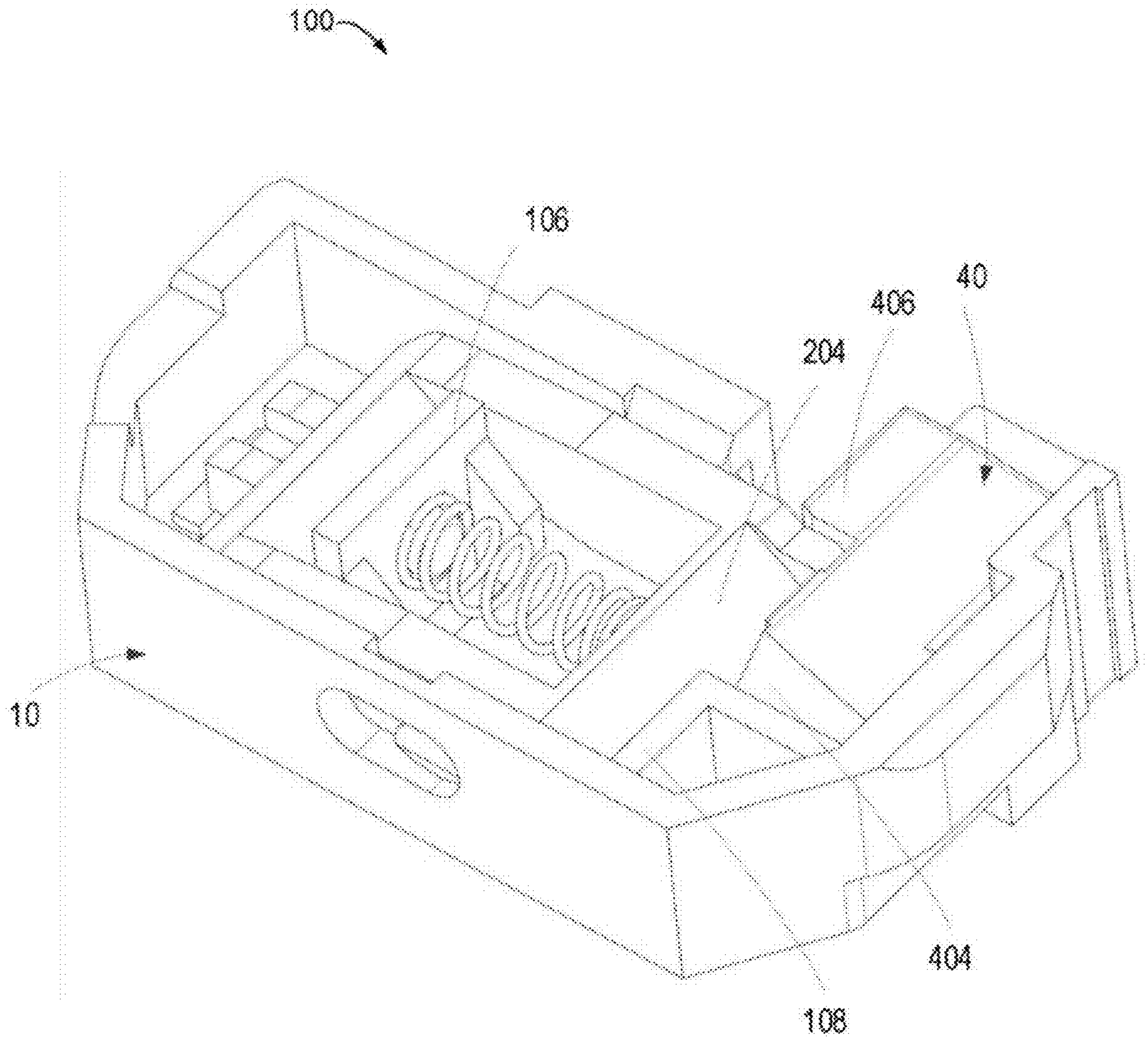
FIG. 14 illustrates a perspective schematic view of a shutter according to further exemplary embodiments of the present disclosure.
Figure 15:
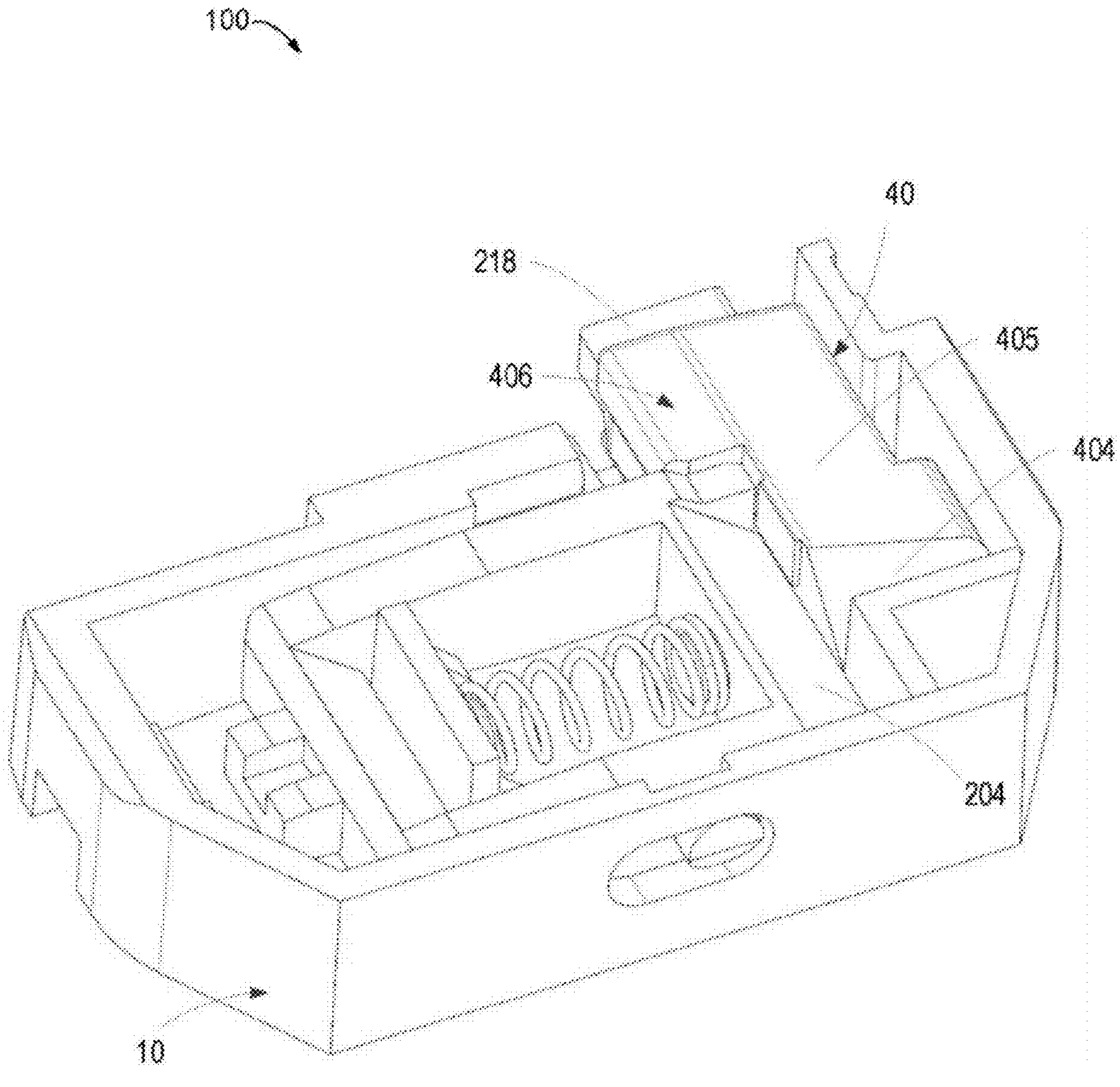
FIG. 15 illustrates a perspective schematic view of a shutter in another angle according to further exemplary embodiments of the present disclosure.
Figure 16:
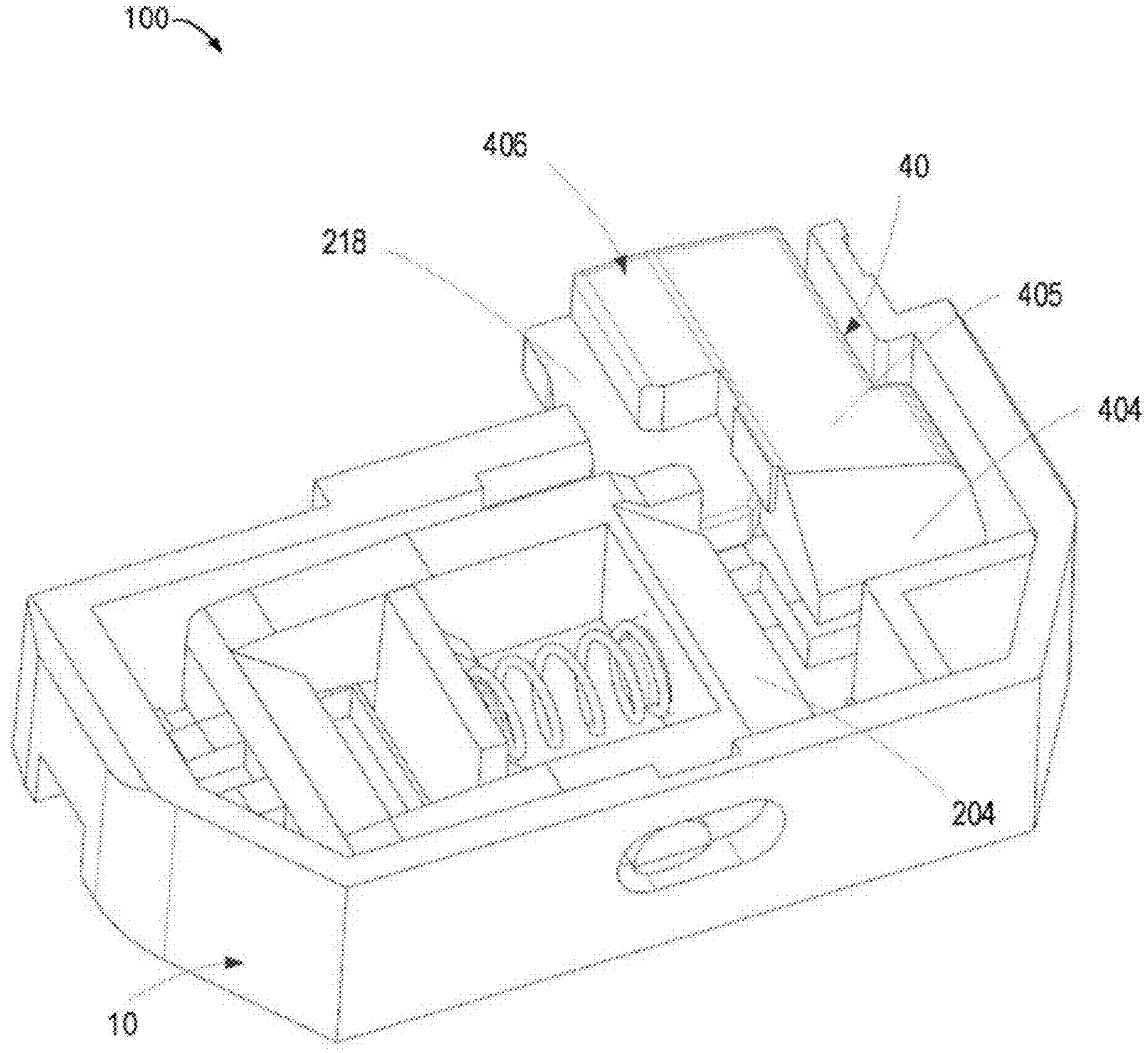
FIG. 16 illustrates a perspective schematic view of a shutter in an open state according to the exemplary embodiment of FIG. 15.
Figure 17:
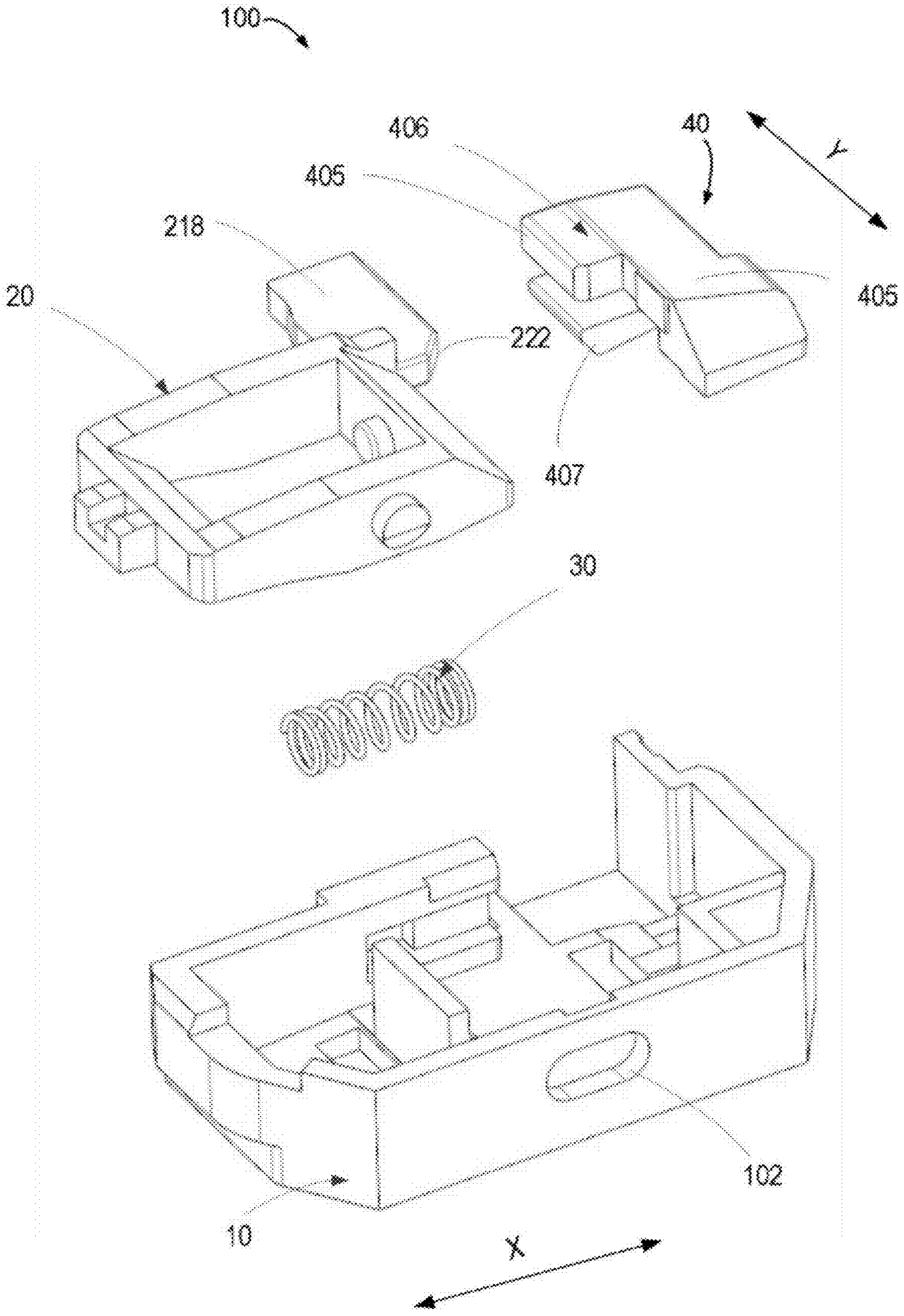
FIG. 17 shows an explosion diagram of a shutter according to further exemplary embodiments of the present disclosure.
Figure 18:
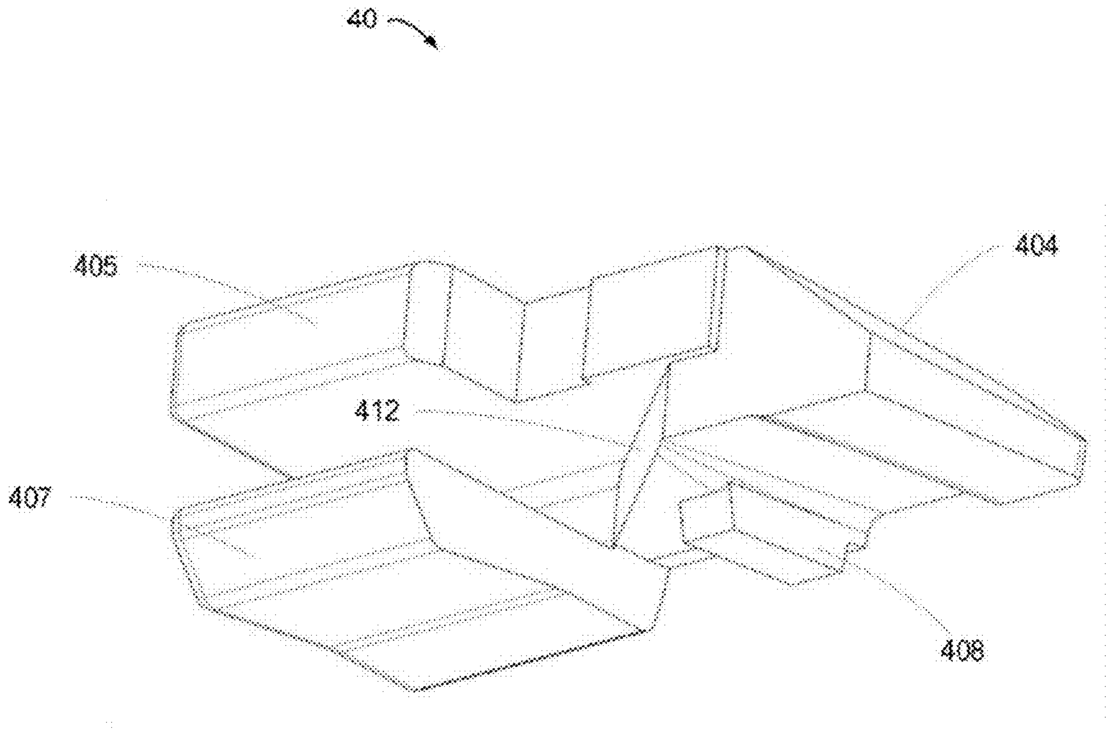
FIG. 18 illustrates a schematic view of a second slider according to further exemplary embodiments of the present disclosure.

FIG. 14 illustrates a perspective schematic view of the shutter 100 according to further exemplary embodiments of the present disclosure; FIG. 15 illustrates a perspective schematic view of another angle of a shutter 100 in another angle according to further exemplary embodiments of the present disclosure. FIG. 16 illustrates a perspective schematic view of the shutter 100 in an open state according to the exemplary embodiment of FIG. 15. FIG. 17 illustrates an explosion diagram of the shutter 100 according to further exemplary embodiments of the present disclosure. FIG. 18 illustrates a schematic view of a second slider according to further exemplary embodiments of the present disclosure.

The shutter 100 of the exemplary embodiment shown in FIGS. 14 to 18 is the same in most structures as that in the previously described embodiments. Therefore, the same structure as that of the previous embodiment will not be described in detail. The differences are mainly described below.

The exemplary embodiments shown in FIGS. 14 to 18 differ from the previously described embodiments mainly in that a rail 218 extends from one side of the first slider 20. In addition, the shutter 100 further includes a second slider coupled to the first slider 20.

In some embodiments, the rail 218 extends from the first end of the first slider body 205 in the second direction Y. The second slider 40 includes the clamping structure 406 that extends from the second slider body to clamp the rail 218, and is adapted to slide along the rail 218, and is adapted to rotate with the first slider body 205 around the support shaft 212.

In some embodiments, the second slider 40 is movably coupled to the first slider 20 and adapted to move in a second direction perpendicular to the first direction X. The second slider 40 may include a second slider body 405, a third guide surface 404. The third guide surface 404 may be located at one end of the second slider body 405 adjacent to the second guide surface 204 and corresponding to a jack perpendicular to the jack corresponding to the second guide surface 204. This configuration of the third guide surface 404 is adapted to block the single insert (e.g., the pin 502) from contacting the corresponding sleeve 504. For example, when only the third guide surface 404 is acted upon by the insert (e.g., when a single metal conductor is inserted into the jack of the socket 200), the second slider 40 drive the first slider body 205 to rotate about the support shaft 212 in the second rotational direction R2 such that the first end of the first slider body 205 bears against the second stopper 116 and the second slider body 405 cooperates with the stopping portion 122 in the socket 200 to prevent the pin 502 from contacting the sleeve 504.

In some embodiments, the second slider 40 may also include a second protruding structure 408. The second protruding structure 408 may be provided on a side of the second slider body 405 facing the bottom surface of the base 10. As shown in FIG. 18, the stopping portion 122 is provided on the bottom surface within the base 10, and the stopping portion 122 is configured to: cooperate with the second protruding structure 408 to prevent the first slider 20 from moving in the second direction when the second slider 40 rotates in the second rotational direction R2.

In some embodiments, as shown in FIG. 17, one end of the rail 218 is provided with a first inclined surface 222. One end of the second slider body 405 is provided with a second inclined surface 412 (see FIG. 18), and the second inclined surface 412 is adapted to cooperate with the first inclined surface 222 so as to drive the second slider 40 back to return to the original position when the first slider 20 returns to the original position under the action of the resilient member 30.

Figure 19:
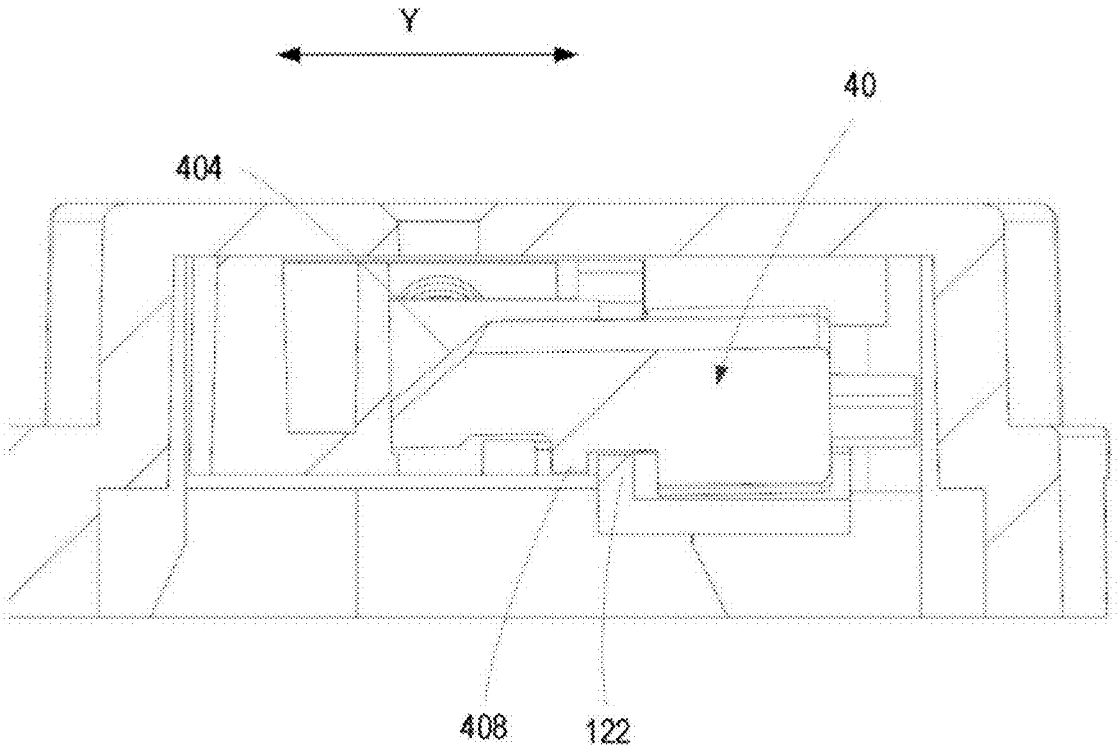
FIG. 19 illustrates a schematic cross-sectional view of a second slider engaged with a stopping portion according to further embodiments of the present disclosure.

The engagement of the stopping portion 122 with the second protruding structure 408 is further described below with reference to FIG. 19. As shown in FIG. 19, in the case where only the third guide surface 404 is pressed by the insert, the pressed end is rotated toward the bottom surface, so that the second protruding structure 408 bears to one side of the stopping portion 122, so that the second slider 40 cannot move in the second direction Y. Thus, the third guide surface 404 still covers the entrance of the sleeve 504 and the insert cannot contact the sleeve 504.

Returning to FIG. 18, as shown, the clamping structure 406 may include: a first extension portion 405, a second extension portion 407, and a connecting portion. The connecting portion connects the first extending portion 405 and the second extending portion 407. One side of the connecting portion has a curved structure that bears against the inner wall of the base 10 to adapt to the rotation of the clamping structure 406. The first extension 405, the second extension 407, and the connecting portion form a U-shaped structure. The structure of the clamping portion shown in the drawings is merely exemplary, and the aspects of the present disclosure are not limited thereto, and various changes may be made.

Figure 20:
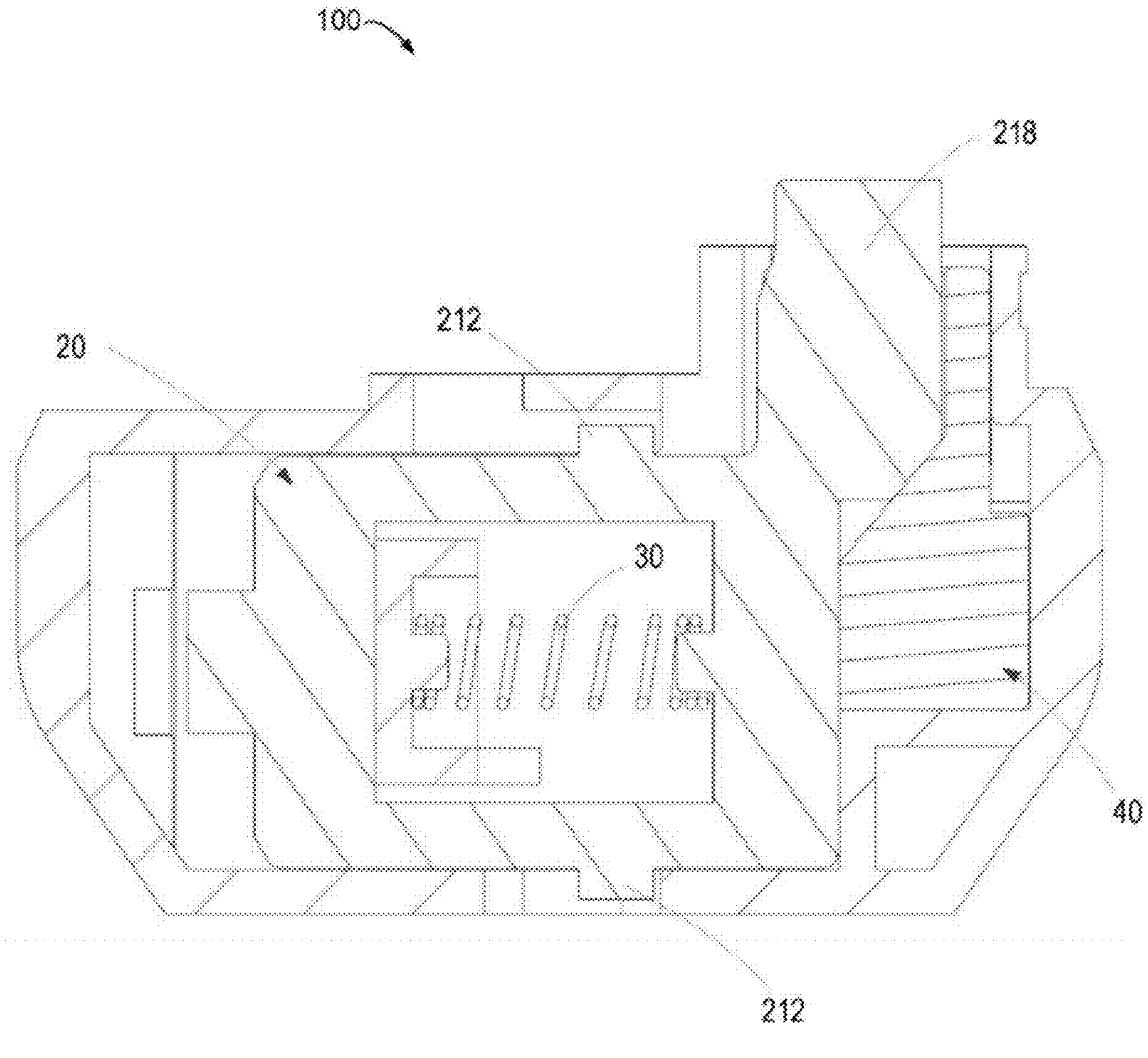
FIG. 20 illustrates a schematic horizontal cross-sectional view of a shutter in a closed state according to further exemplary embodiments of the present disclosure.
Figure 21:
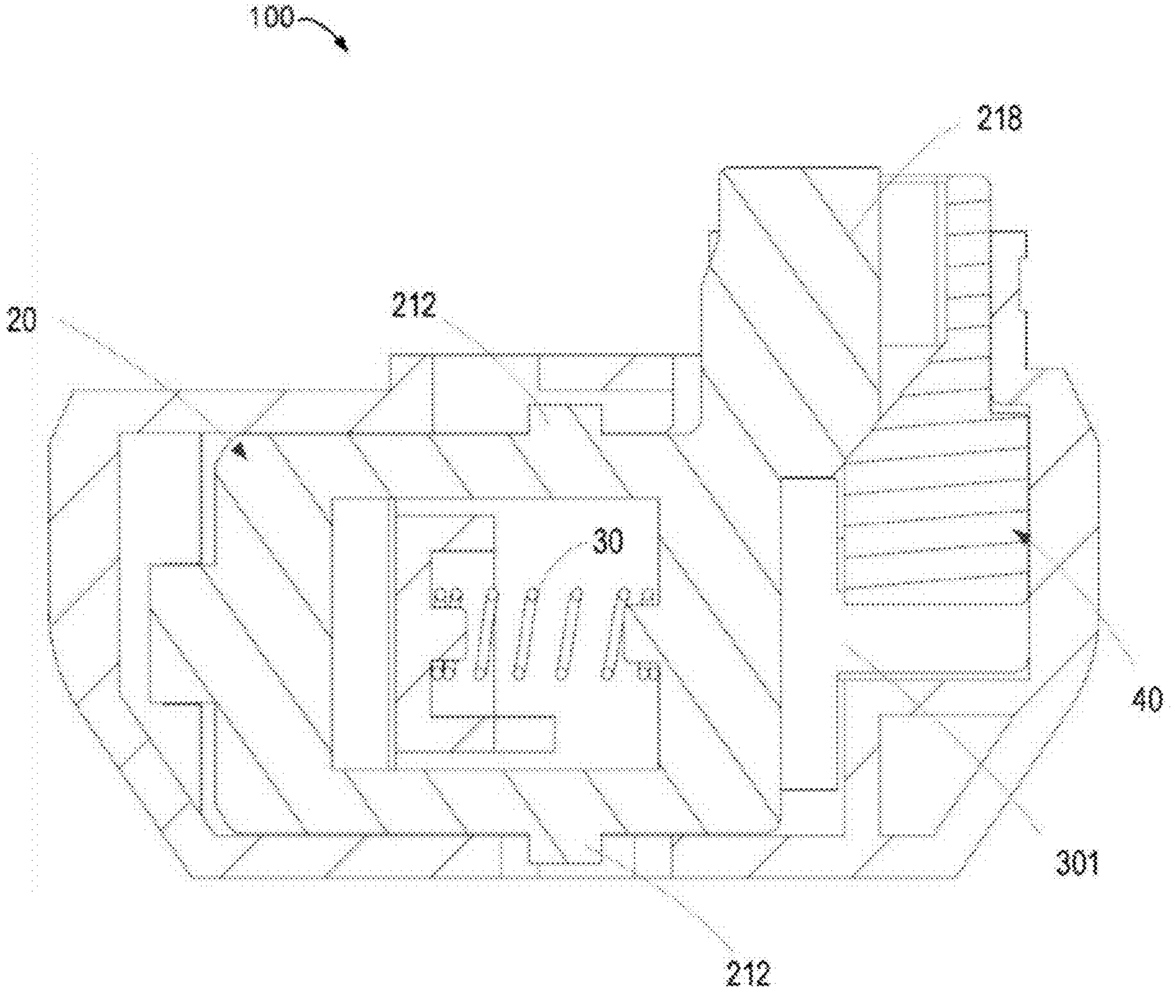
FIG. 21 illustrates a schematic horizontal cross-sectional view of a shutter in an open state according to further exemplary embodiments of the present disclosure.

Various operating states of the shutter 100 according to embodiments of the present disclosure are further described below in conjunction with FIGS. 20 and 21. FIG. 20 illustrates a schematic horizontal cross-sectional view of a shutter 100 in a closed state according to further exemplary embodiments of the present disclosure. FIG. 21 illustrates a schematic horizontal cross-sectional view of a shutter 100 in an open state according to further exemplary embodiments of the present disclosure. As shown in FIG. 20, the first slider 20 bears with the second slider 40. The shutter 100 is thus in a closed position, blocking the inlet of the corresponding sleeve 504. As shown in FIG. 21, the first slider 20 is separated from the second slider 40 by a certain distance and forms a T-shaped gap 301 in the base 10. This gap corresponds to the T-shaped socket of the socket 200. In the open state of the shutter 100, the pins 502 are allowed to contact or insert into the socket 504 through the jack.

The housing 70 enclosing the shutter 100 according to some embodiments of the present disclosure is described below in conjunction with FIGS. 22 and 23.

Figure 22:
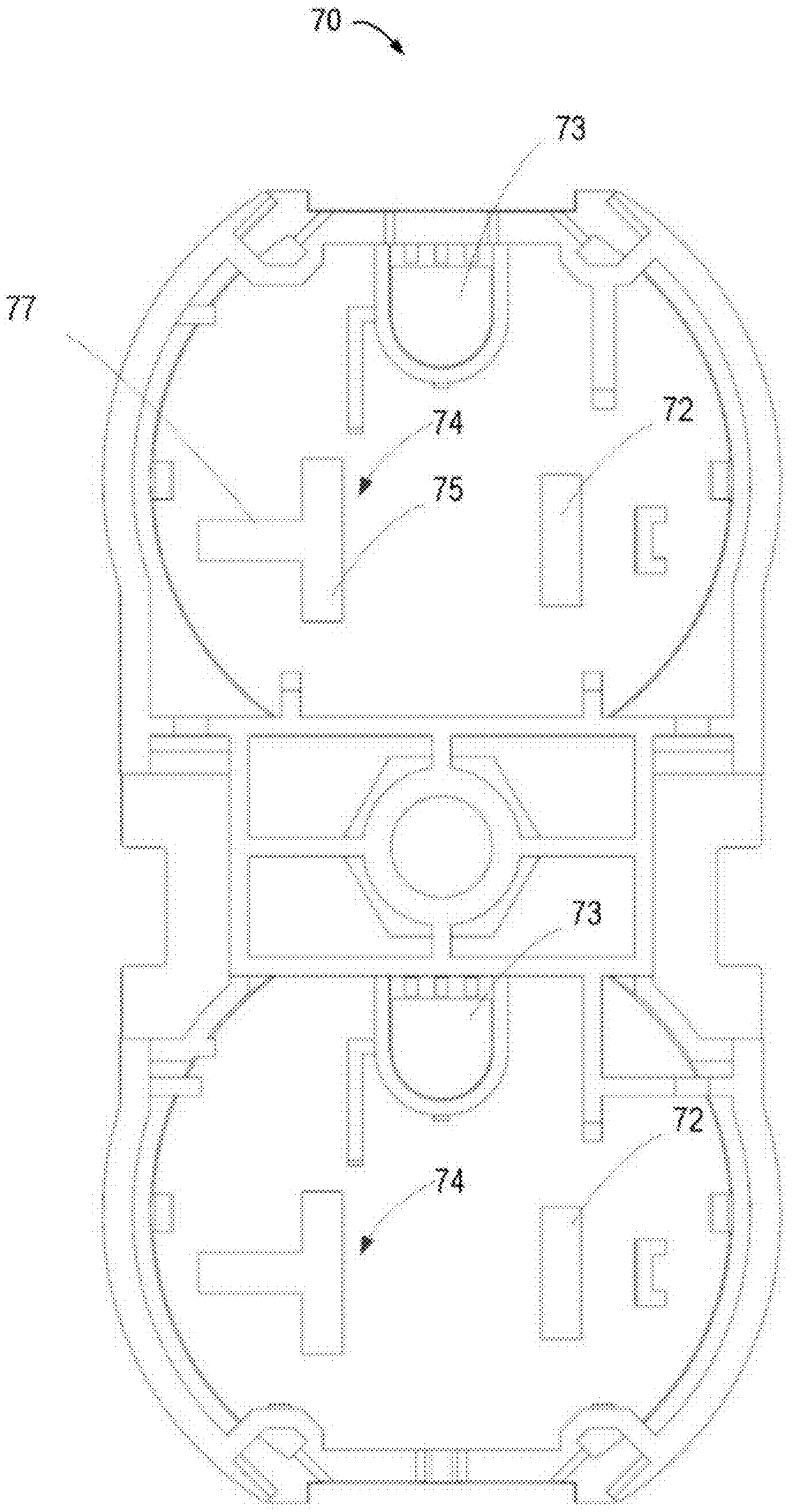
FIG. 22 illustrates a schematic bottom view of a housing of a socket according to further exemplary embodiments of the present disclosure.
Figure 23:
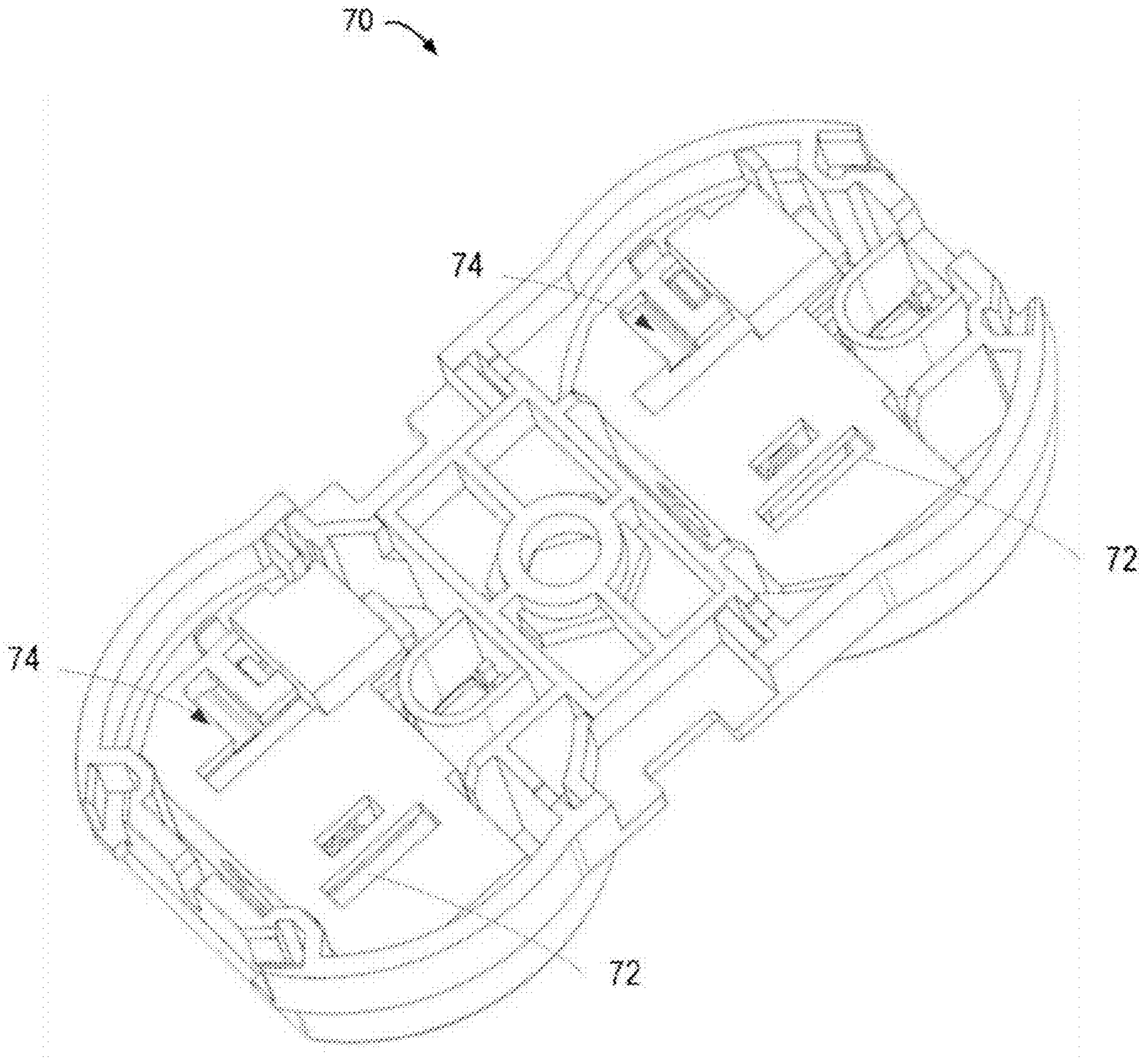
FIG. 23 illustrates a bottom perspective view of a housing of a socket with a shutter installed according to further exemplary embodiments of the present disclosure.

FIG. 22 illustrates a schematic bottom view of a housing of a socket according to further exemplary embodiments of the present disclosure. FIG. 23 illustrates a bottom perspective view of the housing 70 of a socket 200 with a shutter 100 installed according to further exemplary embodiments of the present disclosure.

As shown in FIG. 22, the socket 200 includes two sets of jacks. The figure shows an American standard socket 200 including a live wire jack 72, a neutral wire jack 74, and a ground jack 73. As shown, the neutral jack 74 has a T-shaped configuration including a first longitudinal jack 75 and a first lateral jack 77. This configuration is compatible with two different plugs. For example, an American standard plug of 15 A and an American standard plug of 20 A. For the American standard plug of 15 A, the neutral pin and the live pin are parallel. For the American standard plug of 20 A, the neutral and live pins are vertical. Thus, the socket 200 can be plugged into either the one of 15 A or the one of 20 A FIG. 23 shows a bottom perspective view of the housing 70 of the socket 200 with the shutter 100 installed. The shutter 100 is blocked by the housing 70 and is substantially hidden from view.

The solution of the above-mentioned embodiment is schematically illustrated with an American standard socket 200 as an example, and the solution of the present disclosure is not limited thereto, and the solution of the present disclosure can also be applied to a Chinese standard socket 200 and a plug. For example, it is obvious that a Chinese standard two-pin (two-phase) plug can be inserted into the socket 200 of the disclosed embodiment. For a three-phase plug, the neutral and live wires of a Chinese standard plug are not parallel, typically with an included angle of 60 degrees. Nevertheless, the solution of the present disclosure can still be applied to Chinese plugs. Since Chinese three-phase plugs are typically all in included angles of 60 degrees, there is no need to take the vertical pins 502 into consideration. In this case, the second slider 40 does not need to be provided in the shutter 100. Therefore, the aforementioned shutter 100 including only the first slider 20 can be applied to the socket 200. As long as the neutral pin 502 and the live pin 502 act on the first guide surface 202 and the second guide surface 204, respectively, the first slider 20 is driven to move horizontally to insert the corresponding sleeve 504.

The operating state and principle of the shutter 100 according to an embodiment of the present disclosure will be described with reference to FIGS. 24 to 26.

Figure 24:
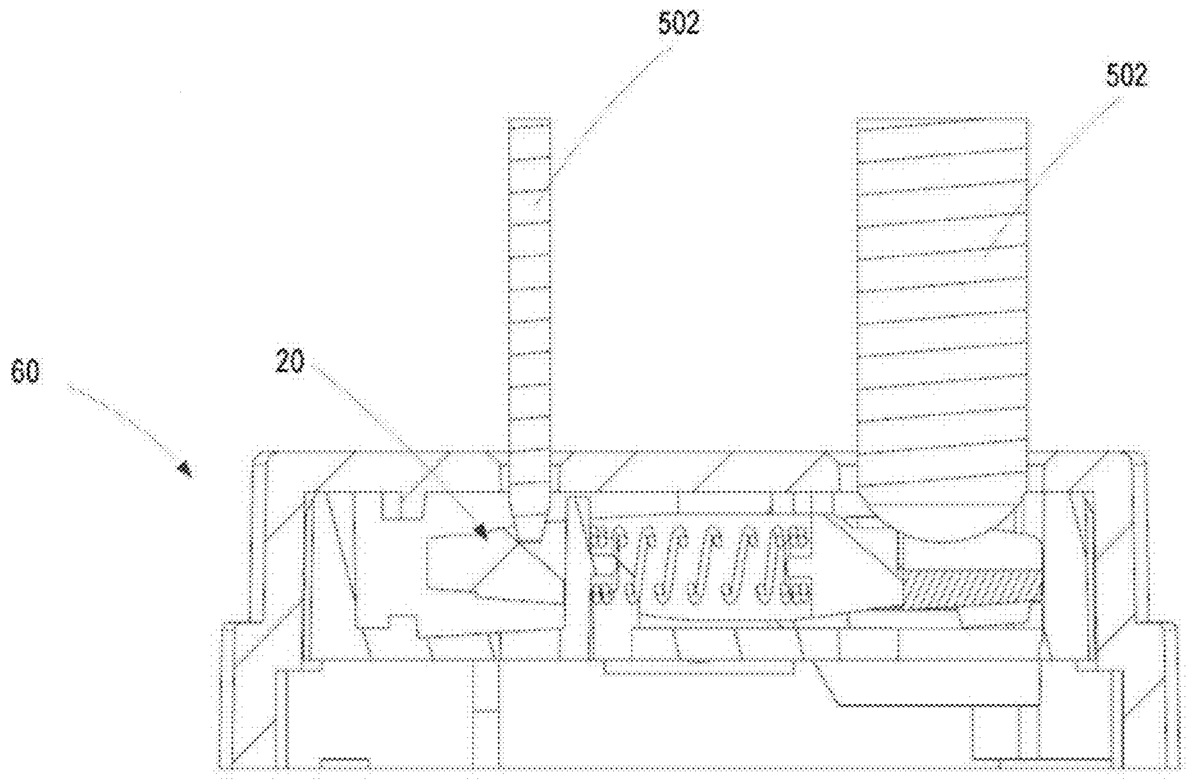
FIG. 24 illustrates a schematic cross-sectional view of a shutter with pins partially inserted according to further exemplary embodiments of the present disclosure.

FIG. 24 illustrates a schematic cross-sectional view of the shutter 100 with pins 502 partially inserted according to further exemplary embodiments of the present disclosure. FIG. 25 illustrates a schematic cross-sectional view of the shutter 100 with the pins 502 penetrated according to further exemplary embodiments of the present disclosure. FIG. 26 illustrates a schematic cross-sectional view of the shutter 100 with a second slider in an open state according to further exemplary embodiments of the present disclosure.

As shown in FIG. 24, two pins 502 are perpendicular to each other. The pins 502 are inserted into the housing 70 and act on the first guide surface 202 and the second guide surface 204. The two pins 502 may be the live wire pin and neutral wire pin of the plug. As shown in FIG. 25, two pins 502 push the first slider 20 to the left and through the shutter 100 and then insert into the sleeve 504 under the shutter 100.

Figure 25:
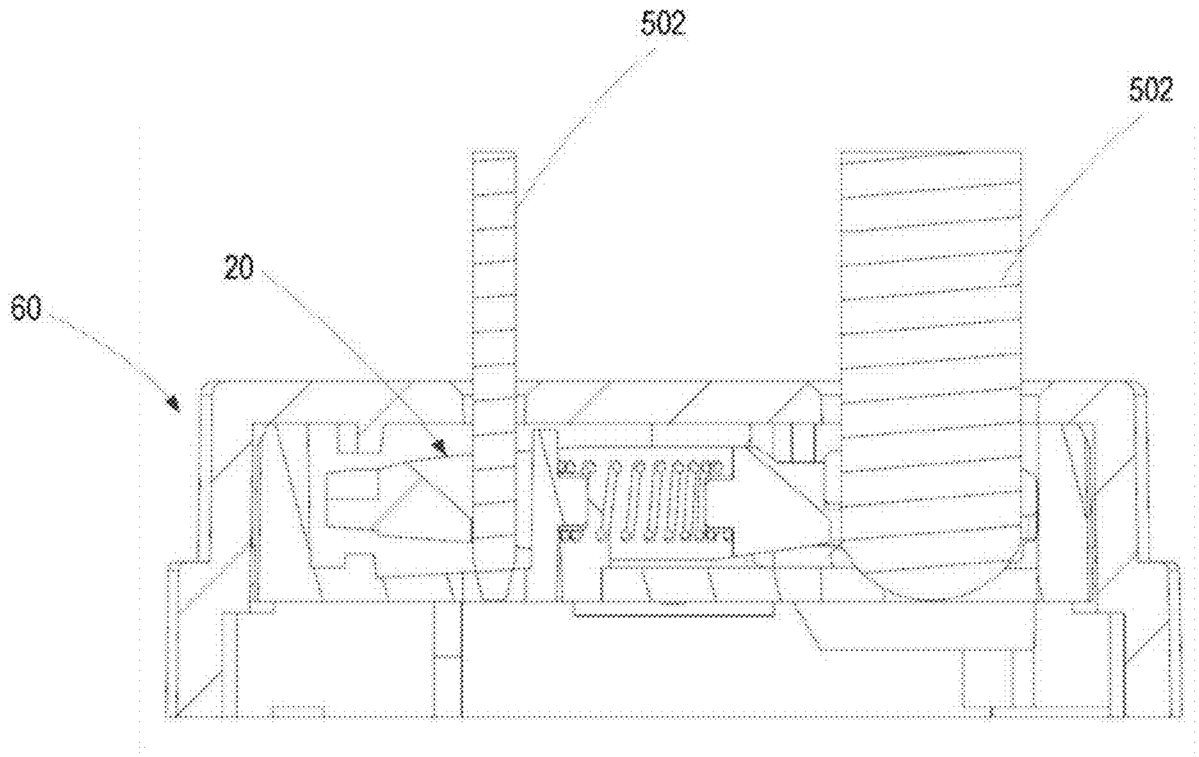
FIG. 25 illustrates a schematic cross-sectional view of a shutter with pins penetrated according to further exemplary embodiments of the present disclosure.
Figure 26:
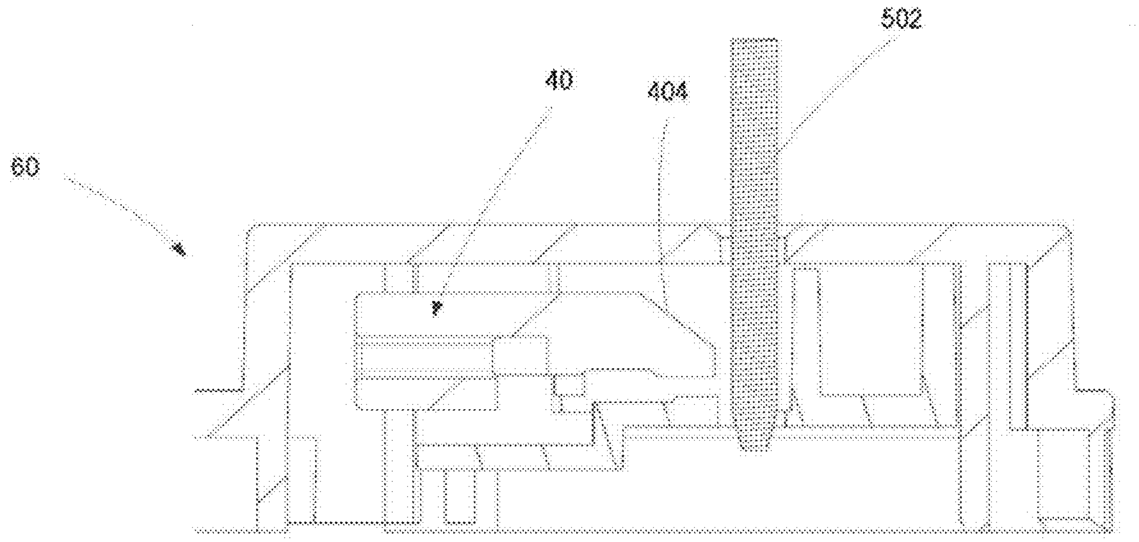
FIG. 26 illustrates a schematic cross-sectional view of a shutter with a second slider in an open state according to further exemplary embodiments of the present disclosure.

FIG. 26 illustrates a schematic cross-sectional view perpendicular to the schematic view shown in FIG. 25 with the second slider 40 in an open state. As shown, the single pin 502 pushes the second slider 40 to translate a predetermined distance by acting on the third guide surface 404 of the second slider 40, i.e., causing the second slider 40 to open, so that the pin 502 can be inserted into the inlet of the lower socket 504.

The operation principle of the shutter 100 of the embodiment of the present disclosure will be described with reference to FIGS. 27 to 30.

Figure 27:
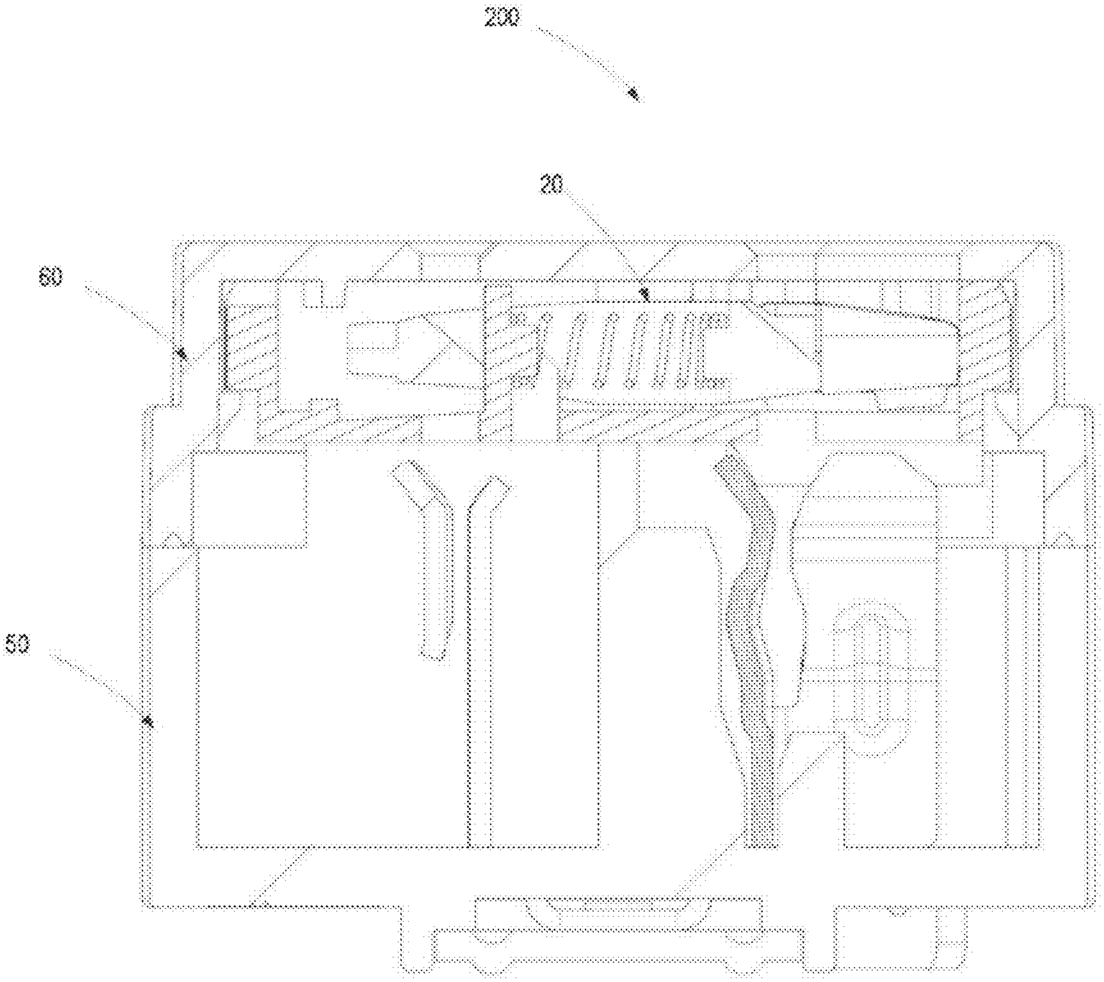
FIG. 27 illustrates a schematic cross-sectional view of a shutter without pins inserted according to further exemplary embodiments of the present disclosure.
Figure 28:
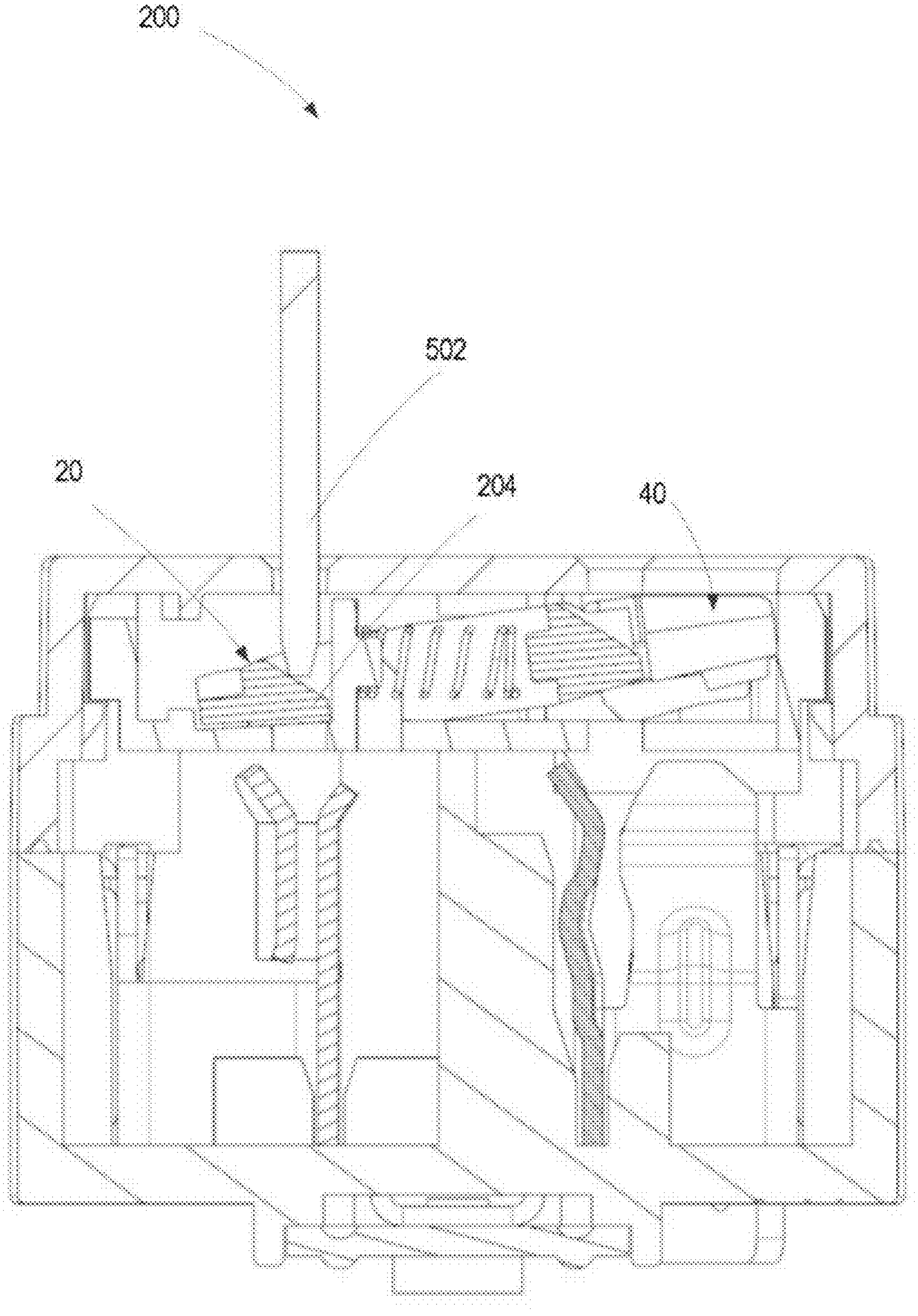
FIG. 28 illustrates a schematic cross-sectional view of a socket with a shutter installed when a single pin is inserted into either a live wire jack or a neutral wire jack according to further exemplary embodiments of the present disclosure.
Figure 29:
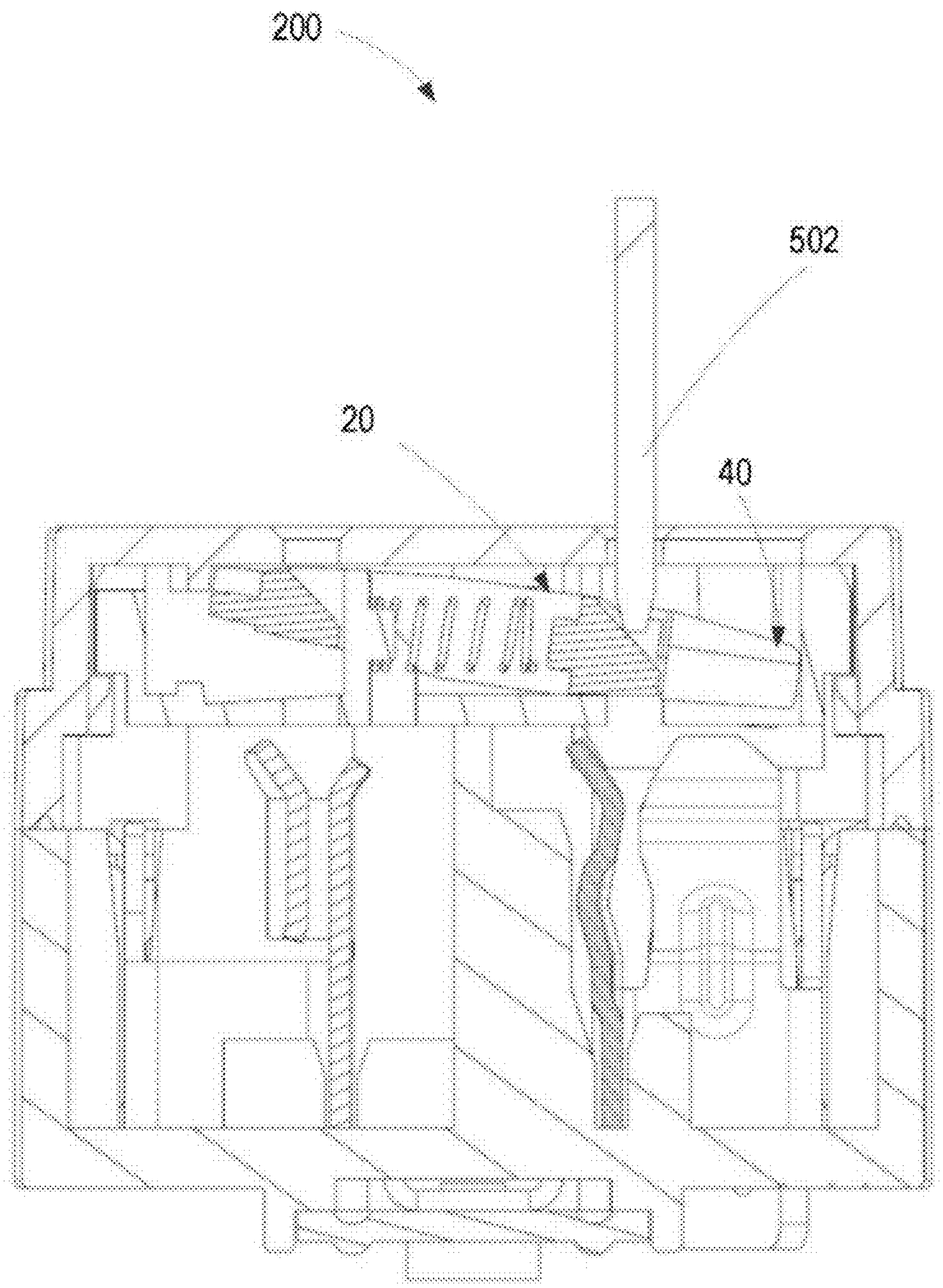
FIG. 29 illustrates a schematic cross-sectional view of an outline of a socket with a shutter installed when a single pin is inserted into either a live wire jack or a neutral wire jack according to some exemplary embodiments of the present disclosure.
Figure 30:
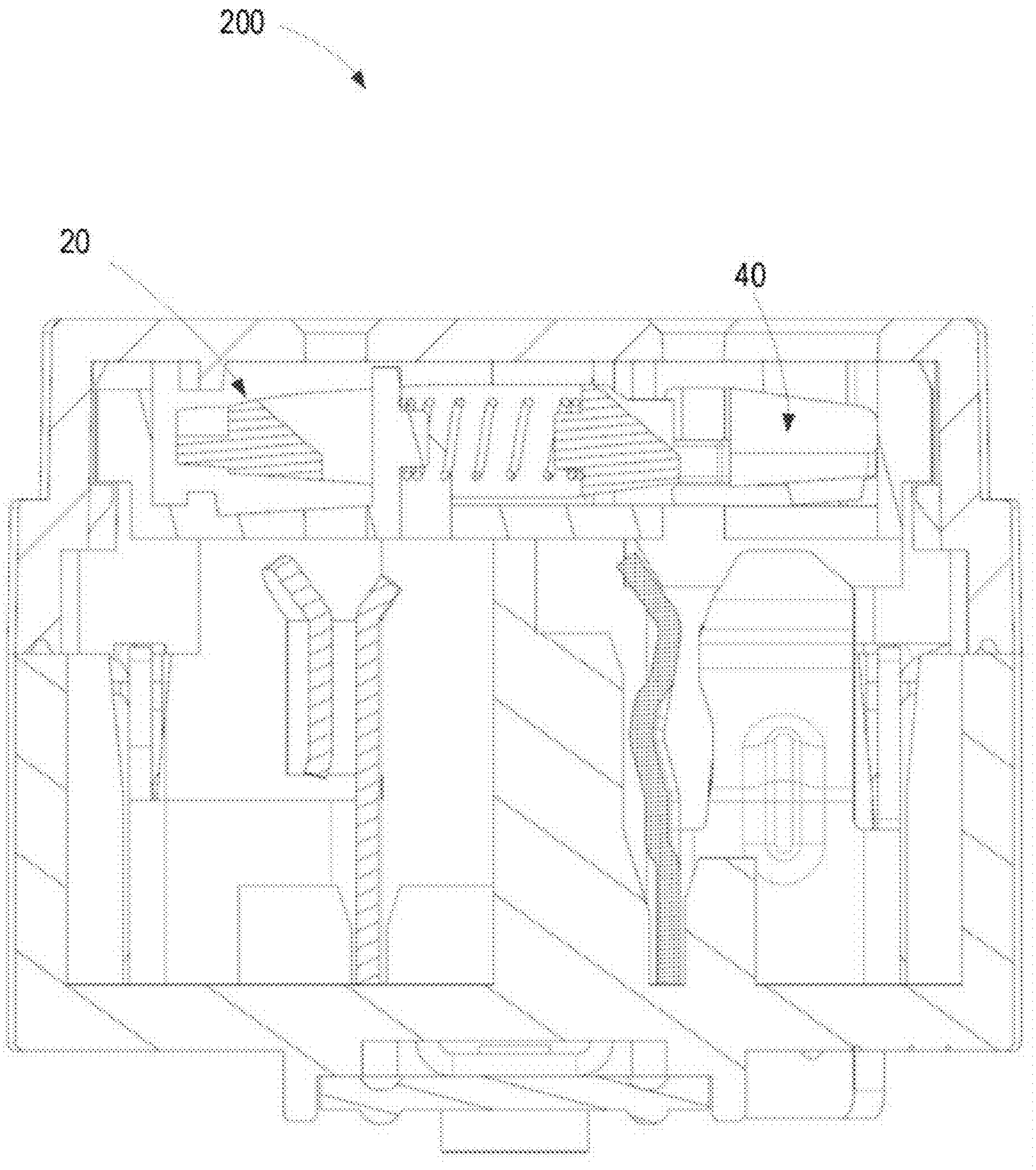
FIG. 30 illustrates a schematic cross-sectional view of a socket with a shutter installed according to some exemplary embodiments of the present disclosure.

FIG. 27 illustrates a schematic cross-sectional view of the shutter 100 without pins 502 inserted according to further exemplary embodiments of the present disclosure. FIG. 28 illustrates a schematic cross-sectional view of the socket 200 with the shutter 100 installed when the single pin is inserted into either a live wire jack or a neutral wire jack according to further exemplary embodiments of the present disclosure. FIG. 29 illustrates a schematic cross-sectional view of an outline of the socket 200 with the shutter 100 installed when the single pin 502 is inserted into either a live wire jack or a neutral wire jack according to some exemplary embodiments of the present disclosure. FIG. 30 illustrates a schematic cross-sectional view of the socket 200 with the shutter 100 installed according to some exemplary embodiments of the present disclosure.

As shown in FIGS. 27 to 30, the shutter 100 is provided in the housing 70. The housing 70 is provided on the body portion 50 of the lower socket 200. The sleeve 504 is provided in the body portion 50. FIG. 27 shows the situation when no pins 502 are inserted into the housing 70. In this state, the shutter 100 is in a closed state, i.e., the first guide surface 202 and the second guide surface 204, as well as the third guide surface 404, close the entrance of the corresponding sleeve 504, preventing the single pin 502 from contacting the sleeve 504.

As shown in FIG. 28, the single pin 502 is inserted into the housing 70 and acts on the first guide surface 202 of the first slider 20. The first slider 20 is forced to rotate in the first rotation direction R1. The first end of the first slider 20 bears against the first stopper 114 provided on the base 10 and cannot continue to rotate nor move in the first direction X. Thus, the bottom edge of the first guide surface 202 remains substantially against the left side of the first positioning member 106 as it would be in the absence of an external force. Thus, the single pin 502 inserted into a left-side socket cannot cause the first slider 20 to move to the left to expose the blocked entrance of the sleeve 504.

As shown in FIG. 29, the single pin 502 is inserted into the housing 70 and acts on the second guide surface 204 of the first slider 20. The first slider 20 is forced to rotate in the second rotation direction R2. The first end of the first slider 20 bears against the second stopper 116 provided on the housing 70 and cannot continue to rotate nor move in the first direction X. Thus, the bottom edge of the second guide surface 204 remains substantially against the left side of the second positioning member 108 as it would be in the absence of an external force. Thus, the single pin 502 inserted into the jack cannot cause the first slider 20 to move to the left to expose the blocked entrance of the sleeve 504.

As shown in FIG. 30, the socket 200 with the shutter 100 installed is in an opened state of the shutter 100, thereby allowing the pins 502 to contact or insert the sleeve 504.

As can be seen, in the embodiment described above, the first slider body 205 rotates about the support shaft 212 when only the single insert (e.g., pin 502) acts on one of the first guide surface 202 and the second guide surface 204 such that the first slider 20 cooperates with the stopper in the socket 200, preventing the first slider 20 from translating, thereby keeping the sleeve 504 closed to block the single insert from contacting the sleeve 504 of the socket 200.

Furthermore, the third guide surface 404 and the first guide surface 202 are adapted to move in the second direction Y and the first direction X, respectively, under the co-action of two vertically provided pins 502, to allow the pins 502 to contact or be inserted into the corresponding sleeves 504. Thus, the erroneous insertion can be prevented. In this way, the level of safety protection of the socket can be improved to further protect personal safety of the operator.

Figure 31:
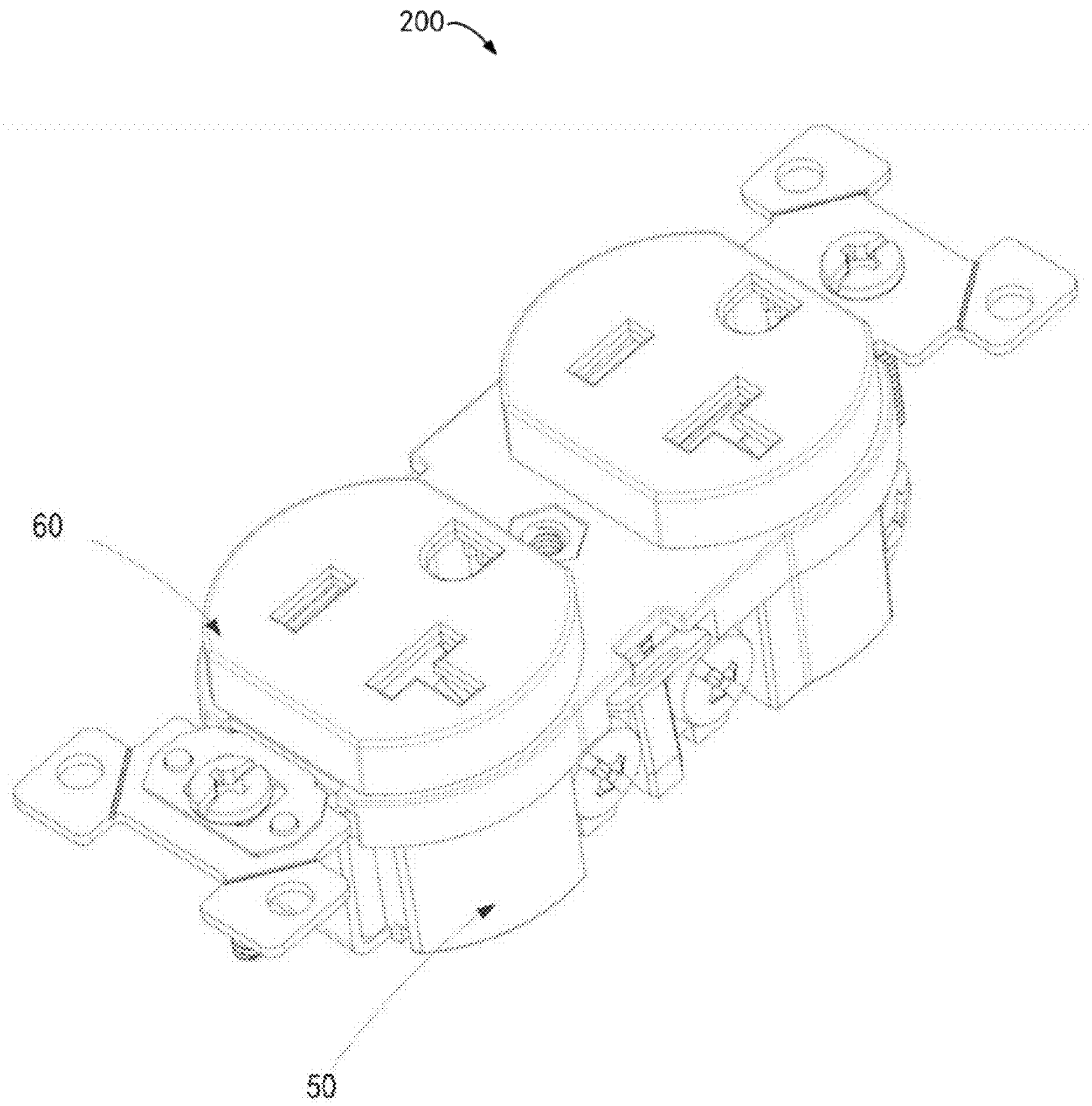
FIG. 31 illustrates a perspective schematic view of a socket with a shutter installed according to some exemplary embodiments of the present disclosure.

FIG. 31 illustrates a perspective schematic view of the socket 200 with the shutter 100 installed according to some exemplary embodiments of the present disclosure. As shown in FIG. 31, two sets of socket 200 are shown for insertion of two plugs.

In the embodiments of the present disclosure, the first slider 20 and/or the second slider 40 rotates rather than translate when the insert is inserted into only one jack of the socket 200, thereby keeping the sleeve 504 closed and thereby preventing the erroneous insertion. In this way, the level of safety protection of the socket can be improved to further protect personal safety of the operator. In addition, embodiments of the present disclosure have configurations in which the number of parts of the shutter is small, for example, in some embodiments, only the first slider 20 and one resilient member 30 are included. Therefore, it is possible to simplify the structure of the shutter 100 to obtain a shutter 100 having a compact structure and reliable performance.

The foregoing embodiments have been described with reference to the embodiments shown in the accompanying drawings. It should be noted that the structure of the shutter 100 shown is merely exemplary, and the embodiments of the present disclosure are not limited thereto, but may be variously modified, for example, the structure and shape of the slider, the base, the housing, etc. may be changed as desired.

Further, according to an embodiment of the present disclosure, there is also provided the socket 200. The socket 200 includes the housing 70, the shutter 100 in the foregoing embodiment, and the main body portion 50. The shutter 100 is provided in the housing 70. The main body portion 50 is coupled to the shutter 100, and the sleeve 504 is provided in the main body portion 50. The socket 200 boasts a compact structure and high reliability.

While various embodiments of the present disclosure have been described above, the above description is illustrative only and is not intended to be exhaustive or to limit the present disclosure. Although claims have been formulated in this application to particular combinations of features, it should be understood that the scope of the disclosure also includes any novel feature or any novel combination of features disclosed herein either explicitly or implicitly or any generalisation thereof, whether or not it relates to the same as presently claimed in any claim. The applicants hereby give notice that new claims may be formulated to such features and/or combinations of such features during the prosecution of the present application or of any further application derived therefrom.

The terminology used herein has been chosen in order to best explain the principles of the embodiments, practical applications, or to improve upon the techniques of the market, or to enable others of ordinary skill in the art to understand the embodiments disclosed herein. It will be apparent to those skilled in the art that various modifications and variations can be made in the present disclosure. Any modifications, equivalents, improvements, etc. That fall within the spirit and principles of the disclosure are intended to be included within the scope thereof.

We claim:

1. A shutter for a socket, comprising:

a base comprising:

- a first positioning member extending upwardly from a bottom surface within the base;
- a first slider comprising:
  - a first slider body having a first guide surface and a second guide surface, the first guide surface corresponding to a live wire jack of the socket, the second guide surface corresponding to a neutral wire jack of the socket; and
  - a support shaft extending from opposite sides of the first slider body, movably and rotatably coupling the first slider body to the base; and
- a resilient member configured to resiliently couple the first slider to the first positioning member such that the first guide surface and the second guide surface are in positions respectively blocking a first sleeve of the socket and a second sleeve of the socket;
- wherein the first slider body is adapted to rotate around the support shaft when only a single insert acts on one of the first guide surface and the second guide surface such that the first slider cooperates with a stopper in the socket to block the single insert from contacting the first sleeve or second sleeve of the socket.

2. The shutter of claim 1, wherein the base further comprises:

a first groove and a second groove respectively provided on a first side wall and a second side wall opposite to the first side wall of the base;

wherein the support shaft is coupled in the first groove and the second groove.

3. The shutter of claim 1, wherein:
the first guide surface is provided near a first end of the first slider body, and a bottom edge of the first guide surface bears against a first side of the first positioning member under an action of the resilient member, and the first side of the first positioning member is aligned with an inlet edge of the first sleeve.

4. The shutter of claim 3, further comprising:
a second positioning member provided on the bottom surface at a predetermined distance from the first positioning member;
wherein the second guide surface provided opposite to the first guide surface at a second end of the first slider body, a bottom edge of the second guide surface bearing against a first side of the second positioning member under the action of the resilient member, the first side of the second positioning member being aligned with an inlet edge of the second sleeve.

5. The shutter of claim 1, wherein the support shaft and the resilient member are configured such that the first slider body maintains a predetermined gap with the bottom surface when neither the first guide surface nor the second guide surface is separately pressed.

6. The shutter of claim 1, wherein the stopper comprises:
a first stopper configured to: when the first slider body rotates in a first rotational direction due to a single insert acting on the first guide surface, bear against a lower portion of a first end of the first slider body to prevent the first slider from moving in a first direction; and
a second stopper configured to: when the first slider body rotates in a second direction of rotation opposite to the first direction of rotation due to a single insert acting on the second guide surface, bear against an upper portion of a first end of the first slider body to prevent the first slider from moving in the first direction.

7. The shutter of claim 6, wherein:
the first stopper is provided on a bottom surface within the base; and
the second stopper is provided within a housing of the socket.

8. The shutter of claim 1, wherein a first protruding structure is provided at a first end of the first slider body, wherein the first protruding structure is adapted to bear against the stopper.

9. The shutter of claim 1, wherein the first guide surface and the second guide surface are inclined surfaces and are inclined in a same direction.

10. The shutter of claim 1, wherein the first slider body has a hollow structure, and is provided in the base around the first positioning member, and the first guide surface and the second guide surface are provided at opposite sides of the first positioning member.

11. The shutter of claim 9, wherein:
a first protrusion is provided on one side of the first positioning member;
a second protrusion is provided on an inner wall of the first slider body near the second guide surface; and
one end of the resilient member is fixedly coupled to the first protrusion, and an opposite end of the resilient member is fixedly coupled to the second protrusion.

12. The shutter of claim 6, further comprising:
a second slider movably coupled to the first slider and adapted to move along a second direction perpendicular to the first direction, the second slider comprising:
a second slider body; and
a third guide surface, located at one end of the second slider body, adjacent to the second guide surface, corresponding to a jack perpendicular to the neutral wire jack corresponding to the second guide surface, and adapted to block the single insert from contacting a sleeve corresponding to the perpendicular jack; and
wherein when only the third guide surface is acted upon by an insert, the second slider drive the first slider body to rotate around the support shaft in a second rotation direction such that a first end of the first slider body bears the second stopper, and the second slider body cooperates with a stopping portion in the socket to prevent the single insert from contacting the socket.

13. The shutter of claim 12, wherein the second slider further comprises:
a second protruding structure provided on a side of the second slider body facing a bottom surface of the base;
wherein, the stopping portion is provided on a bottom surface within the base, and the stopping portion is configured to: cooperate with the second protruding structure to prevent the first slider from moving in the second direction when the second slider rotates in a second rotational direction.

14. The shutter of claim 12, wherein:
the first slider includes a rail extending from a first end of the first slider body in the second direction; and
the second slider includes a clamping structure extending from the second slider body to clamp the rail and adapted to slide along the rail, and adapted to rotate with the first slider body around the support shaft.

15. The shutter of claim 14, wherein:
one end of the rail is provided with a first inclined surface; and
one end of the second slider body is provided with a second inclined surface, and the second inclined surface is adapted to cooperate with the first inclined surface so as to drive the second slider to reset when the first slider resets under an action of the resilient member.

16. The shutter of claim 14, wherein the clamping structure comprises:
a first extension portion;
a second extension portion provided opposite to the first extension portion and adapted to be clamped on both sides of the rail; and
a connecting portion connecting the first extension portion and the second extension portion, one side of the connecting portion having a curved surface structure that bears against an inner wall of the base to adapt to rotation of the clamping structure; and
wherein the first extension portion, the second extension portion and the connecting portion constitute a U-shaped structure.

17. A socket comprising:
a housing;
a shutter comprising:
a base comprising:
a first positioning member extending upwardly from a bottom surface within the base;
a first slider comprising:
a first slider body having a first guide surface and a second guide surface, the first guide surface corresponding to a live wire jack of the socket, the second guide surface corresponding to a neutral wire jack of the socket; and a support shaft extending from opposite sides of the first slider body, movably and rotatably coupling the first slider body to the base; and a resilient member configured to resiliently couple the first slider to the first positioning member such that the first guide surface and the second guide surface are in positions respectively blocking a first sleeve of the socket and a second sleeve of the socket;

wherein the first slider body is adapted to rotate around the support shaft when only a single insert acts on one of the first guide surface and the second guide surface such that the first slider cooperates with a stopper in the socket to block the single insert from contacting the first sleeve or second sleeve of the socket, wherein the shutter is mounted to the housing; and a body portion coupled to the shutter, wherein the first sleeve and the second sleeve are provided in the body portion.

18. The socket of claim 17, wherein the first guide surface and the second guide surface of the first slider are inclined surfaces.

19. The socket of claim 17, wherein the support shaft and the resilient member are configured such that the first slider body maintains a predetermined gap with the bottom surface when neither the first guide surface nor the second guide surface is separately pressed.

20. A socket comprising:

a housing; and a shutter mounted to the housing, the shutter comprising:

a base comprising:

a first positioning member extending upwardly from a bottom surface within the base; and a first slider comprising:

a first slider body having a first guide surface and a second guide surface, the first guide surface corresponding to a live wire jack of the socket, the second guide surface corresponding to a neutral wire jack of the socket; and a support shaft extending from opposite sides of the first slider body, movably and rotatably coupling the first slider body to the base; and a resilient member configured to resiliently couple the first slider to the first positioning member such that the first guide surface and the second guide surface are in positions respectively blocking a first sleeve of the socket and a second sleeve of the socket;

wherein the first slider body is adapted to rotate around the support shaft when only a single insert acts on one of the first guide surface and the second guide surface such that the first slider cooperates with a stopper in the socket to block the single insert from contacting the first sleeve or second sleeve of the socket.

* * * * *